(12) United States Patent
Kijima et al.

(10) Patent No.: US 11,927,787 B2
(45) Date of Patent: Mar. 12, 2024

(54) ILLUMINATION DEVICE AND DISPLAY DEVICE

(71) Applicant: Japan Display Inc., Tokyo (JP)

(72) Inventors: Hiroaki Kijima, Tokyo (JP); Shinichi Komura, Tokyo (JP); Koichi Okuda, Tokyo (JP); Ken Onoda, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/987,890

(22) Filed: Nov. 16, 2022

(65) Prior Publication Data

US 2023/0152630 A1    May 18, 2023

(30) Foreign Application Priority Data

Nov. 16, 2021 (JP) ................................. 2021-186415

(51) Int. Cl.
*F21V 8/00* (2006.01)
*G02F 1/13357* (2006.01)

(52) U.S. Cl.
CPC .......... *G02B 6/002* (2013.01); *G02B 6/0021* (2013.01); *G02B 6/0028* (2013.01); *G02B 6/0068* (2013.01); *G02B 6/0076* (2013.01); *G02B 6/0091* (2013.01); *G02F 1/133615* (2013.01)

(58) Field of Classification Search
CPC ..... G02B 6/002; G02B 6/0076; G02B 6/0091
See application file for complete search history.

(56) References Cited

U.S. PATENT DOCUMENTS

| 11,262,493 | B2* | 3/2022 | Li ......................... G02F 1/1336 |
| 2003/0184690 | A1* | 10/2003 | Ogiwara ........... G02F 1/133615 349/61 |
| 2011/0242837 | A1* | 10/2011 | Cornelissen ........... G02B 6/002 362/555 |
| 2019/0155027 | A1* | 5/2019 | Marshall .................. G02B 6/12 |
| 2021/0041620 | A1 | 2/2021 | Kijima et al. |

FOREIGN PATENT DOCUMENTS

JP        2021-26905 A        2/2021

* cited by examiner

*Primary Examiner* — Keith G. Delahoussaye
(74) *Attorney, Agent, or Firm* — XSENSUS LLP

(57) ABSTRACT

According to one embodiment, an illumination device includes a first light guide having a first side surface, a second side surface located on a side opposite to the first side surface in a first direction, a first main surface, and a first opposed surface located on a side opposite to the first main surface in a second direction intersecting the first direction and a first light source opposed to the first side surface to emit first P-polarized light to the first side surface, the first side surface is inclined to the first main surface and the first opposed surface, the first light source is inclined to a first straight line perpendicular to the first side surface.

13 Claims, 17 Drawing Sheets ized light and S-polarized light are made incident.

ILLUMINATION DEVICE AND DISPLAY DEVICE

CROSS-REFERENCE TO RELATED APPLICATIONS

This application is based upon and claims the benefit of priority from Japanese Patent Application No. 2021-186415, filed Nov. 16, 2021, the entire contents of which are incorporated herein by reference.

FIELD

Embodiments described herein relate generally to an illumination device and a display device.

BACKGROUND

For example, a display device such as a liquid crystal display device comprises a display panel with pixels and an illumination device such as a backlight that illuminates the display panel. The illumination device comprises a light source that emits light and a light guide to which light from the light source is emitted. The light from the light source is made incident on the light guide from a side surface of the light guide, propagates the inside of the light guide, and is emitted from an emission surface corresponding to one of main surfaces of the light guide.

For example, a configuration in which two light guides overlap is also known. In conventional illumination devices, however, there is a problem that the light partially escapes from the light guide before made incident from the side surface of the light guide and emitted from the emission surface, resulting in the decrease in emission efficiency.

DETAILED DESCRIPTION

Figure 1:
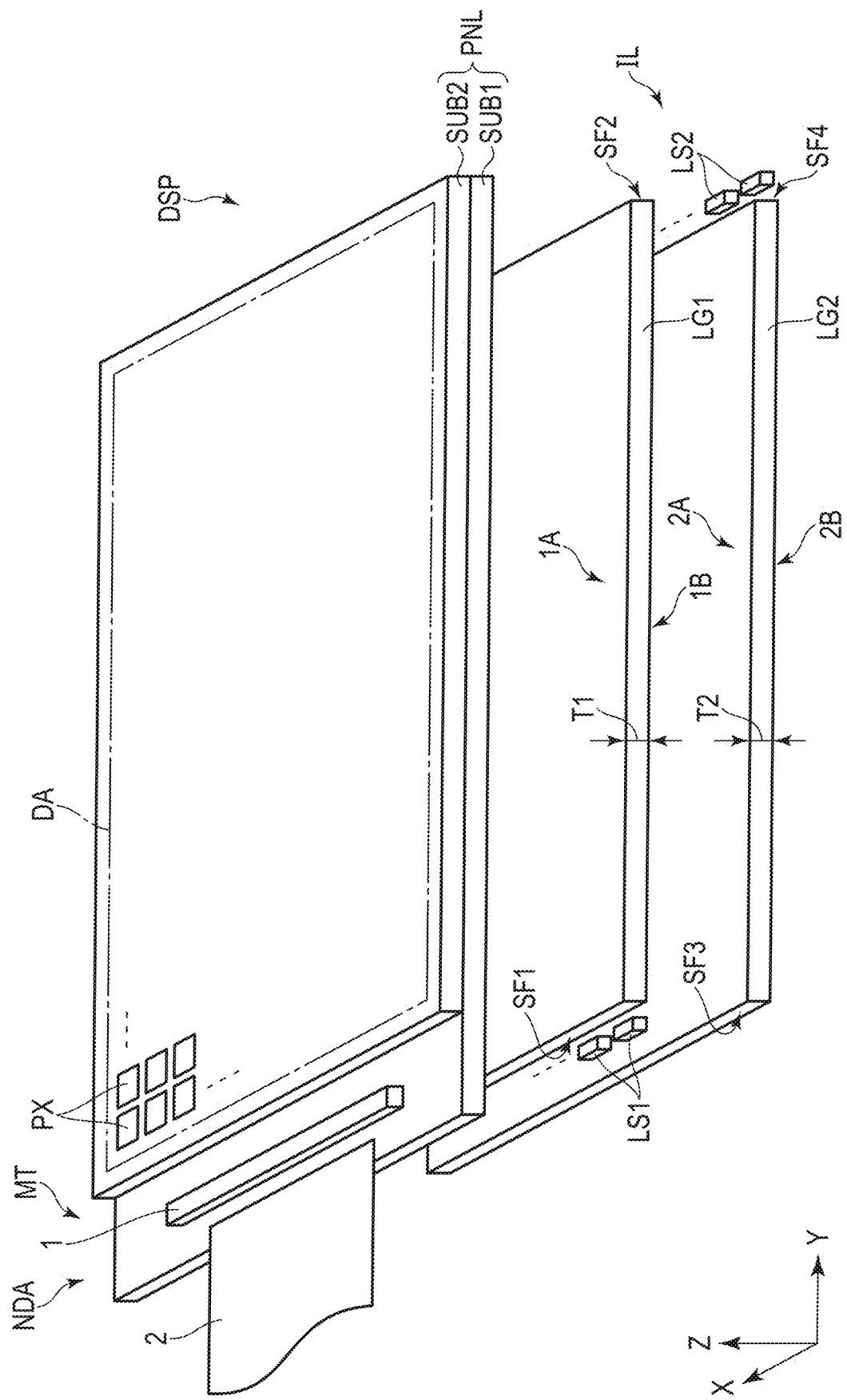
FIG. 1 is an exploded perspective view showing a configuration example of a display device of a first embodiment.

In general, according to one embodiment, an illumination device comprises a first light guide having a first side surface, a second side surface located on a side opposite to the first side surface in a first direction, a first main surface, and a first opposed surface located on a side opposite to the first main surface in a second direction intersecting the first direction and a first light source opposed to the first side surface to emit first P-polarized light to the first side surface, the first side surface is inclined to the first main surface and the first opposed surface, the first light source is inclined to a first straight line perpendicular to the first side surface.

According to another embodiment, a display device comprises the illumination device and a display panel displaying an image, the display panel is opposed to the first main surface.

According to the configuration described above, an illumination device and a display device capable of improving an emission efficiency can be provided.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the embodiments, a transmissive liquid crystal display device is disclosed as an example of the display device DSP. In addition, an illumination device used as a backlight of a transmissive liquid crystal display device is disclosed as an example of the illumination device. A main configuration disclosed in the embodiments can be applied to a liquid crystal display device comprising not only a transmissive function, but also a reflective function reflecting external light and using the external light for the display, an electronic paper display device with electrophoretic elements and the like, a display device utilizing micro-electromechanical systems (MEMS), a display device employing electrochromism, or the like. Furthermore, the main configuration disclosed in the embodiments can also be applied to an illumination device used for applications other than the backlight.

First Embodiment

FIG. 1 is an exploded perspective view showing a configuration example of a display device DSP according to the embodiment. FIG. 1 shows a direction X, a direction Y (first direction), and a direction Z (second direction). The direction X, the direction Y, and the direction Z are orthogonal to each other but may intersect at an angle other than 90 degrees. The direction X and the direction Y correspond to directions parallel to a main surface of a substrate constituting a liquid crystal display device (hereinafter often simply referred to as a display device) DSP, and the direction Z corresponds to a thickness direction of the display device DSP. In the present specification, a direction from a first substrate SUB1 to a second substrate SUB2 is referred to as an upper side (or, more simply, upwardly) and a direction from the second substrate SUB2 to the first substrate SUB1 is referred to as a lower side (or, more simply, downwardly). According to "a second layer above a first layer" and "a second layer under a first layer", the second layer may be in contact with the first layer or may be separated from the first layer. It is assumed that an observation position at which the display device DSP is to be observed is set at a tip side of an arrow indicating the third direction Z, and viewing toward an X-Y plane defined by the direction X and the direction Y from this observation position is referred to as planar view. The X-Z plane is defined by the direction X and the direction Z. The Y-Z plane is defined by the second direction and the direction Z. IN addition, a "length of a predetermined substance, object, or area in the direction X and the direction Y" is often referred to as a "width", and a "length of a predetermined substance, object, or area in the third direction" is often referred to as a "thickness" or a "height".

The display device DSP comprises a display panel PNL, an illumination device IL, an IC chip 1, and a wiring board 2.

The display panel PNL comprises a first substrate SUB1 and a second substrate SUB2. The first substrate SUB1 and the second substrate SUB2 are opposed to each other. A display function layer (liquid crystal layer LC to be described later, in the embodiment) is provided between the substrates SUB1 and SUB2. The display panel PNL includes a display area DA and a non-display area NDA. The display area DA is an area where images are displayed. The display area DA is located substantially in the center of the area where the first substrate SUB1 and the second substrate SUB2 are opposed to each other. The non-display area NDA is an area where no images are displayed and is located outside the display area DA. The display panel PNL comprises, for example, a plurality of pixels PX arrayed in a matrix in the display area DA.

The IC chip 1 and the wiring board 2 often read signals from the display panel PNL, but mainly function as signal sources which supply signals to the display panel PNL. The IC chip 1 and the wiring board 2 are located in the non-display area NDA. In the example shown in FIG. 1, the IC chip 1 and the wiring substrate 2 are located on a mounting portion MT of the first substrate SUB1 extending outside from a substrate side edge (or often referred to as a substrate end portion) of the second substrate SUB2. The wiring board 2 is, for example, a foldable flexible printed board. The IC chip 1 may be provided on the wiring board 2.

The illumination device IL illuminates the display panel PNL. The illumination device IL comprises a light guide LG1, a light guide LG2, a plurality of light sources LS1, and a plurality of light sources LS2. The light guide LG2, the light guide LG1, the first substrate SUB1, and the second substrate SUB2 are arranged in order of description toward the tip side of the arrow in the direction Z.

The light guide LG1 is an insulating substrate such as a glass substrate or a plastic substrate. The light guide LG1 is formed of a substrate formed of a material containing acrylic resin, for example, an acrylic substrate. The light guide LG1 is formed in a flat plate shape parallel to the X-Y plane. The light guide LG1 has a main surface 1A opposed to the display panel PNL, an opposed surface 1B located on a side opposite to the main surface 1A in the direction Z, a side surface SF1, and a side surface SF2 located on a side opposite to the side surface SF1 in the direction Y. The main surface 1A and the opposed surface 1B are, for example, parallel to the X-Y plane and are provided parallel to each other. The main surface 1A and the opposed surface 1B may be non-parallel to each other. The side surface SF1 and the side surface SF2 are opposed to each other in the direction Y. The side surface SF1 is, for example, non-parallel to the X-Z plane. The side surface SF2 is, for example, parallel to the X-Z plane. The side surface SF1 and the side surface SF2 are, for example, provided non-parallel to each other. The side surface SF1 and the side surface SF2 may be provided parallel to the X-Z plane and parallel to each other. The light guide LG1 has a thickness T1. The thickness T1 is equal to a length from the opposed surface 1B to the main surface 1A in the direction Z.

The plurality of light sources LS1 are arranged at intervals in the direction X. In the example shown in FIG. 1, the plurality of light sources LS1 are opposed to the side surface SF1. In addition, the plurality of light sources LS1 are spaced apart in the direction X and arranged along the side surface SF1.

The light guide LG2 is an insulating substrate such as a glass substrate or a plastic substrate. The light guide LG2 is formed of, for example, the same material as the light guide LG1. The light guide LG2 may not be formed of the same material as the light guide LG1. The light guide LG2 is formed of a substrate formed of a material containing acrylic resin, for example, an acrylic substrate. The light guide LG2 is formed in a flat plate shape parallel to the X-Y plane. The light guide LG2 has a main surface 2A opposed to the opposed surface 1B, an opposed surface 2B located on a side opposite to the main surface 2A in the direction Z, a side surface SF3 arranged with the side surface SF1 in the direction Z, and a side surface SF4 located on a side opposite to the side surface SF3 in the direction Y and arranged with the side surface SF2 in the direction Z. The main surface 2A and the opposed surface 2B are, for example, parallel to the X-Y plane and are provided parallel to each other. The main surface 2A and the opposed surface 2B may be non-parallel to each other. The side surface SF3 and the side surface SF4 are opposed to each other in the direction Y. The side surface SF3 is, for example, parallel to the X-Z plane. The side surface SF4 is, for example, non-parallel to the X-Z plane. The side surface SF3 and the side surface SF4 are, for example, provided non-parallel to each other. The side surface SF3 and the side surface SF4 may be provided parallel to the X-Z plane and parallel to each other. The light guide LG2 has a thickness T2. The thickness T2 is equal to a length from the opposed surface 2B to the main surface 2A in the direction Z.

The plurality of light sources LS2 are arranged at intervals in the direction X. In the example shown in FIG. 1, the plurality of light sources LS2 are opposed to the side surface SF4. In addition, the plurality of light sources LS2 are spaced apart in the direction X and arranged along the side surface SF4.

The light sources LS1 and LS2 are, for example, laser light sources such as semiconductor lasers that emit polarized laser light. The light sources LS1 and LS2 are not limited to the light sources emitting laser light, but may be, for example, light emitting diodes.

The light sources LS1 and LS2 may comprise a plurality of light emitting elements that emit light of different colors. For example, each of the light sources LS1 and LS2 comprises three light emitting elements that emit red, green, and blue light, respectively. When comprising three light emitting elements that emit red, green, and blue light, the light sources LS1 and LS2 can obtain light of a mixture of these colors (for example, white color).

Figure 2:
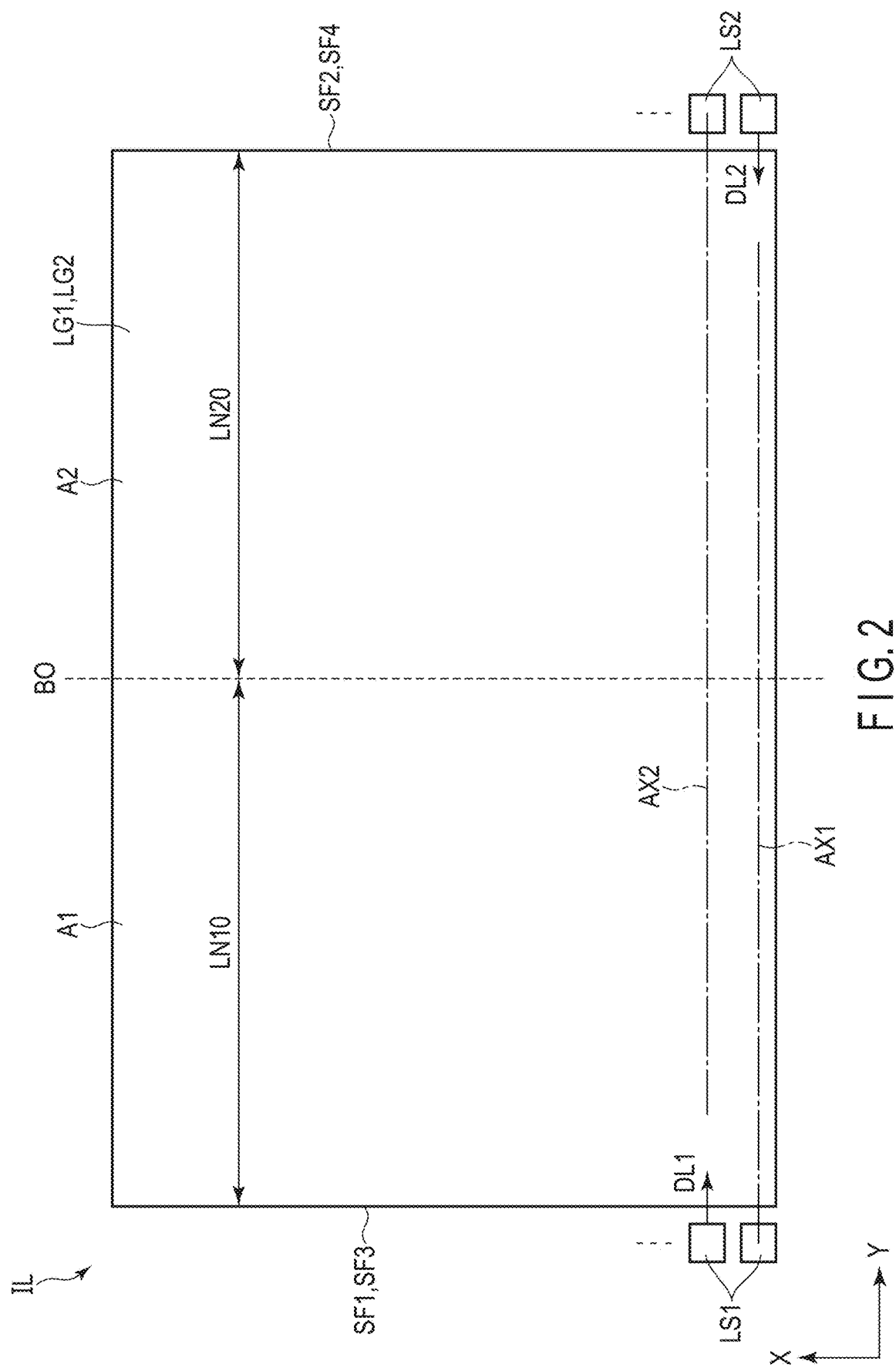
FIG. 2 is a plan view of the illumination device shown in FIG. 1.

FIG. 2 is a plan view of the illumination device IL shown in FIG. 1. As shown in FIG. 2, the illumination device IL includes a first area A1, a second area A2, and a boundary BO between the first area A1 and the second area A2. The first area A1 has a length LN10 in the direction Y, and the second area A2 has a length LN20 in the direction Y. The length LN10 is equal to the length LN20. The length LN10 may not be equal to the length LN20. The terms "same", "identical", "equivalent", and "equal" mean indicate that a plurality of target objects, spaces, areas or the like are the same in physical quantity, material, configuration (structure) or the like, and are slightly different to the extent that they can be regarded as substantially the same. In the example shown in FIG. 2, each of the light guide LG1 and light guide LG2 is located in the entire first area A1 and the entire second area A2. In other words, each of the main surface 1A, the opposed surface 1B, the main surface 2A, and the opposed surface 2B shown in FIG. 2 is located in the first area A1 and the second area A2. The side surface SF1 and the side surface SF3 are located in the first area A1, and the side surface SF2 and the side surface SF4 are located in the second area A2. The boundary BO corresponds to each of a middle part between the side surface SF1 and the side surface SF2 and a middle part between the side surface SF3 and the side surface SF4. For example, the boundary BO corresponds to a middle part between a leading part opposite to a tip side of an arrow indicating the direction Y of the side surface SF1 and a leading part on a tip side of an arrow indicating the direction Y of the side surface SF2. For example, the boundary BO corresponds to a middle part between a leading part opposite to a tip side of an arrow indicating the direction Y of the side surface SF3 and a leading part on a tip side of an arrow indicating the direction Y of the side surface SF4.

The light source LS1 emits light toward the side surface SF1 in an emission direction DL1. The intensity of the light emitted from the light source LS1 is the highest at the optical axis AX1, and the emission direction DL1 is parallel to the optical axis AX1. The light source LS2 emits light toward the side surface SF4 in the emission direction DL2. The intensity of the light emitted from the light source LS2 is the highest at the optical axis AX2, and the emission direction DL2 is parallel to the optical axis AX2.

Figure 3:
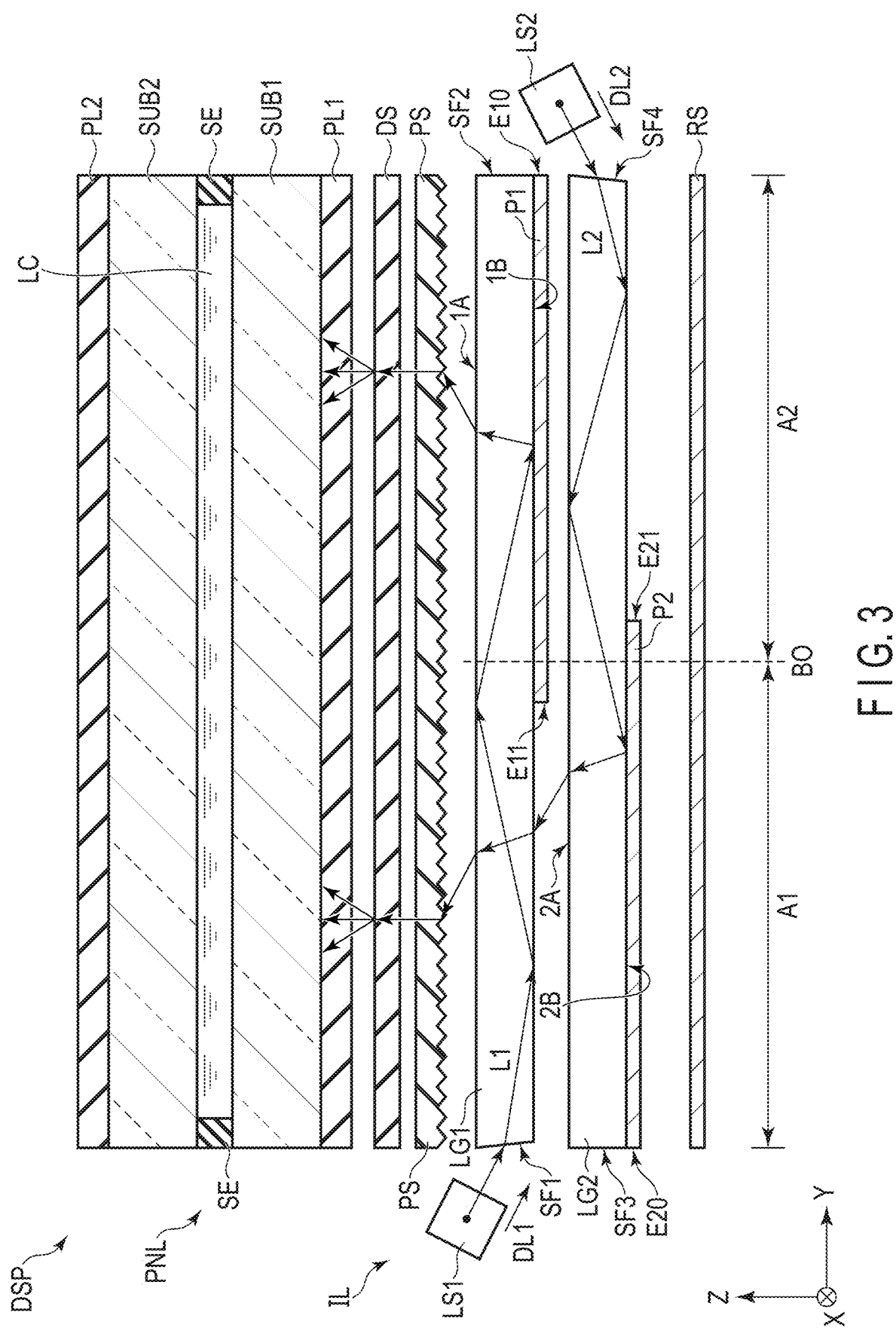
FIG. 3 is a cross-sectional view of the display device shown in FIG. 1.

FIG. 3 is a cross-sectional view of the display device DSP shown in FIG. 1. As shown in FIG. 3, the display panel PNL further comprises a liquid crystal layer LC, a seal SE, a polarizer PL1, and a polarizer PL2.

The liquid crystal layer LC and the seal SE are located between the first substrate SUB1 and the second substrate SUB2. The seal SE bonds a first substrate SUB1 and a second substrate SUB2, and seals a liquid crystal layer LC between the first substrate SUB1 and the second substrate SUB2.

The polarizer PL1 is bonded to a lower surface of the first substrate SUB1. The polarizer PL2 is bonded to an upper surface of the second substrate SUB2. A polarization axis of the polarizer PL1 and a polarization axis of the polarizer PL2 are, for example, orthogonal to each other.

The illumination device IL further comprises a reflective layer P1, a reflective layer P2, a diffusion sheet DS, a prism sheet PS, and a reflective sheet RS. A plurality of, for example, two prism sheets PS may be provided to overlap in the direction Z.

The diffusion sheet DS is located between the display panel PNL and the light guide LG1. The diffusion sheet DS diffuses light made incident on the diffusion sheet DS to uniform the luminance of the light. The prism sheet PS is located between the diffusion sheet DS and the light guide LG1. For example, the prism sheet PS focuses light emitted from the main surface 1A of the light guide LG1, in the direction Z. The prism sheet PS is composed of a plurality of prisms continuously arranged in the direction Y. The plurality of prisms of the prism sheet PS protrude toward the main surface 1A in the direction Z. The prisms of the prism sheet PS have a triangular cross-sectional shape parallel to the Y-Z plane. The cross-sectional shapes of each prism of the prism sheet PS parallel to the Y-Z plane are similar to each other. A bottom angle of the prisms of the prism sheet PS may be hereinafter referred to as an inverted prism bottom angle. The reflective sheet RS is opposed to the opposed surface 2B of the light guide LG2. For example, the reflective sheet RS reflects the light leaking from within the light guide LG2 and makes the light incident on the light guide LG2 again.

In the illumination device IL, the side surface SF1 is a slope that extends toward a direction between the side opposite to the tip of the arrow indicating the direction Y and the tip side of the arrow indicating the direction Z. In other words, the side surface SF1 is a slope that extends from the inside to the outside of direction Y according to the direction Z from the lower side to the upper side. In FIG. 3, the main surface 1A extends to a side opposite to the tip of the arrow indicating the direction Y with respect to the opposed surface 1B. The side surface SF1 may be a slope that extends in a direction between a side opposite to the tip of the arrow indicating the direction Y and a side opposite to the tip of the arrow indicating the direction Z. In other words, the side surface SF1 may be a slope that extends from the inside to the outside of the direction Y according to the direction Z from the upper side to the lower side. In FIG. 3, the opposed surface 1B may extend to a side opposite to the tip of the arrow indicating the direction Y with respect to the main surface 1A.

The side surface SF1 is inclined at an acute angle to the main surface 1A and at an obtuse angle to the opposed surface 1B. In other words, the side surface SF1 is inclined at an acute angle to the main surface 1A. In addition, the side surface SF1 is inclined at an obtuse angle to the opposed side 1B. For example, the side surface SF1 is inclined at an angle smaller than 90° with respect to the main surface 1A and at an angle larger than 90° (degrees)—Brewster's angle. The side surface SF1 may be inclined at an obtuse angle with respect to the main surface 1A and at an acute angle with respect to the opposed surface 1B. In other words, the side surface SF1 may be inclined at an obtuse angle with respect to the main surface 1A. In addition, the side surface SF1 may be inclined at an acute angle with respect to the opposed surface 1B. For example, the side surface SF1 may be inclined at an angle larger than 90° with respect to the main surface 1A and at an angle smaller than 90° (degrees)—Brewster's angle.

In the illumination device IL, the side surface SF4 is a slope that extends toward a direction between the tip side of the arrow indicating the direction Y and the tip side of the arrow indicating the direction Z. In other words, the side surface SF4 is a slope that extends from the inside to the outside of direction Y according to the direction Z from the lower side to the upper side. In FIG. 3, the main surface 2A extends to the tip side of the arrow indicating the direction Y with respect to the opposed surface 2B. The side surface SF4 may be a slope that extends in a direction between the the tip side of the arrow indicating the direction Y and a side opposite to the tip of the arrow indicating the direction Z. In other words, the side surface SF4 is a slope that extends from the inside to the outside of the direction Y according to the direction Z from the upper side to the lower side. In FIG. 3, the opposed surface 2B may extend to the side of the arrow indicating the direction Y with respect to the main surface 2A.

The side surface SF4 is inclined at an acute angle to the main surface 2A and at an obtuse angle to the opposed surface 2B. In other words, the side surface SF4 is inclined at an acute angle with respect to the main surface 2A. In addition, the side surface SF4 is inclined at an obtuse angle to the opposed surface 2B. For example, the side surface SF4 is inclined at an angle smaller than 90° with respect to the main surface 2A and at an angle larger than 90°—Brewster's angle. The side surface SF4 may be inclined at an obtuse angle with respect to the main surface 2A and at an acute angle with respect to the opposed surface 2B. In other words, the side surface SF4 may be inclined at an obtuse angle with respect to the main surface 2A. In addition, the side surface SF4 may be inclined at an acute angle with respect to the opposed surface 2B. For example, the side surface SF4 may be inclined at an angle larger than 0° with respect to the main surface 2A and at an angle smaller than 90°—Brewster's angle.

Each of the reflective layer P1 and the reflective layer P2 is a layer including a plurality of prisms, which will be described below in detail.

The reflective layer P1 is located on the opposed side 1B. The reflective layer P1 extends from the second area A2 to a predetermined position between the boundary BO and the side surface SF1 beyond the boundary BO, in the direction Y. The reflective layer P1 may extend within the second area A2. The reflective layer P1 includes an end portion E10 on the tip side of the arrow indicating the direction Y and an end portion E11 on the side opposite to the end portion E10 in the direction Y. The end portion E10 is located between the boundary BO and the side surface SF2. The end portion E10 is located on the side surface SF2 side between the boundary BO and the side surface SF2. The end portion E10 is close to the side surface SF2. For example, the end portion E10 overlaps with the side surface SF2. The end portion E10 may not overlap with the side surface SF2. The end portion E11 is located between the side surface SF1 and the boundary BO. The end portion E11 is located on the boundary BO side between the side surface SF1 and the boundary BO. The end portion E11 is located near the boundary BO. The end portion E11 may be located between the side surface SF2 and the boundary BO. The end portion E11 may be located on the boundary BO side between the side surface SF2 and the boundary BO. For example, the end portion E10 corresponds to the position of the prism closest to the side surface SF2, of the plurality of prisms included in the reflective layer P1 (prisms PA to be described below). For example, the end portion E11 corresponds to the position of the prism closest to the side surface SF1, of the plurality of prisms included in the reflective layer P1 (prisms PA to be described below).

The reflective layer P2 is located on the opposed surface 2B. The reflective layer P2 extends from the second area A2 to a predetermined position between the boundary BO and the side surface SF4 beyond the boundary BO. The reflective layer P2 may extend within the second area A2. The reflective layer P2 includes an end portion E20 and an end portion E21 on the side opposite to the end portion E20. The end portion E20 is located between the side surface SF3 and the boundary BO. The end portion E20 is located on the side surface SF3 side between the side surface SF3 and the boundary BO. The end portion E20 is close to the side surface SF3. For example, the end portion E20 overlaps with the side surface SF3. The end portion E20 may not overlap with the side surface SF3. The end portion E21 is located between the boundary BO and the side surface SF4. The end portion E21 is located on the boundary BO side between the boundary BO and the side surface SF4. The end portion E21 is located near the boundary BO. The end portion E21 may be located between the side surface SF3 and the boundary BO. The end portion E21 may be located on the boundary BO side between the side surface SF3 and the boundary BO. For example, the end portion E20 corresponds to the position of the prism closest to the side surface SF3, of the plurality of prisms included in the reflective layer P2 (prisms PA to be described below). For example, the end portion E21 corresponds to the position of the prism closest to the side surface SF4, of the plurality of prisms included in the reflective layer P2 (prisms PA to be described below).

The reflective layer P1 and the reflective layer P2 overlap with each other in the direction Z in the boundary BO and the vicinity of the boundary BO. The reflective layer P1 and the reflective layer P2 may not overlap with each other in the direction Z in the boundary BO and the vicinity of the boundary BO.

The light source LS1 is separated from the side surface SF1. The emission direction DL1 of the light source LS1 is the direction that intersects a line parallel to a center line passing the center of the thickness T1 of the light guide LG1 and extending in the direction Y. The light source LS2 is separated from the side surface SF4. The emission direction DL2 of the light source LS2 is the direction that intersects a line parallel to a center line passing the center of the thickness T2 of the light guide LG2 and extending in the direction Y.

Light L1 emitted from the light source LS1 is not reflected at all or almost at an interface between the side surface SF1 and an air layer, but is made incident on the light guide LG1 from the side surface SF1 and is refracted on the side surface SF1. Light traveling toward the opposed surface 1B, of the light L1 made incident on the light guide LG1 is reflected (for example, total reflection) at the interface between the light guide LG1 and the air layer. In addition, light traveling toward the main surface 1A, of the light L1 made incident on the light guide LG1 is reflected (for example, total reflection) at the interface between the light guide LG1 and the air layer. Thus, in the area where the reflective layer P1 is not provided, of the first area A1, the light L1 travels toward the tip side of the arrow indicating the direction Y, inside the light guide LG1, while repeatedly reflected on the main surface 1A and the opposed surface 1B (for example, total reflection). The angle of the total reflection condition is a constant value calculated by subtracting a critical angle which is calculated based on the refractive index of the light guide LG1 and the refractive index of the air layer, from 90°, and is 48° in a case where the light guide LG1 is formed of, for example, glass. When the angle formed between the light and the main surface or opposed surface is smaller than or equal to the angle of total reflection condition, the light is totally reflected on the main surface or opposed surface. In contrast, when the angle formed between the light and the main surface or opposed surface is larger than the angle of total reflection condition, the light deviates from the total reflection condition and is extracted from the main surface or opposed surface, which is the emission surface.

Light traveling toward the reflective layer P1, of the light L1 traveling inside the light guide LG1, is reflected on the prisms of the reflective layer P1 such that its traveling direction is changed. The light reflected on the prisms of the reflective layer P1 deviates from the total reflection condition of the main surface 1A and is emitted from the main surface 1A. The light emitted from the main surface 1A illuminates the display panel PNL through the prism sheet PS and the diffusion sheet DS. In other words, in the area where the reflective layer P1 is not provided (or the area close to the side surface SF1), of the first area A1, emission of the light L1 incident from the side surface SF1, from the light guide LG1 toward the display panel PNL, is suppressed.

Similarly, light L2 emitted from the light source LS2 is not reflected at all or almost at the interface between the side surface SF4 and the air layer, but is made incident on the light guide LG2 from the side surface SF4 and is refracted on the side surface SF4. Light traveling toward the opposed surface 2B, of the light L2 made incident on the light guide LG2 is reflected (for example, total reflection) at the interface between the light guide LG2 and the air layer. In addition, light traveling toward the main surface 2A, of the light L2 made incident on the light guide LG2 is reflected (for example, total reflection) at the interface between the light guide LG2 and the air layer. Thus, in the area where the reflective layer P2 is not provided, of the second area A2, the light L2 travels toward the side opposite to the tip side of the arrow indicating the direction Y, inside the light guide LG2, while repeatedly reflected on the main surface 2A and the opposed surface 2B (for example, total reflection).

The light L2 traveling toward the reflective layer P2, of the light L2 traveling inside the light guide LG2, is reflected on the prisms of the reflective layer P2 such that its traveling direction is changed. The light reflected on the prisms of the reflective layer P2 deviates from the total reflection condition of the main surface 2A and is emitted from the main surface 2A. The light emitted from the main surface 2A illuminates the display panel PNL through the light guide LG1, the prism sheet PS, and the diffusion sheet DS. In other words, in the area where the reflective layer P2 is not provided (or the area close to the side surface SF4), of the second area A2, emission of the light L2 incident from the side surface SF4, from the light guide LG2 toward the display panel PNL, is suppressed.

The display panel PNL is illuminated in the first area A1 mainly by the light L2 from the light source LS2. The display panel PNL is illuminated in the second area A2 mainly by the light L1 from the light source LS1.

In general, light beams from a plurality of light sources arranged at intervals travel inside the light guide while each diffused, but these light beams are not mixed sufficiently in the vicinity of the light sources. For this reason, in a display device using such light as illumination light, there is a risk that stripe-shaped non-uniformity in luminance or chromaticity deviation resulting from differences in intensity may be visually recognized when the display area is watched in planar view. The difference in intensity of illumination light is smaller at a position more separated from the light source.

In the example shown in FIG. 3, in the area where the reflective layer P1 is not provided, of the first area A1, the light L1 made incident from the side surface SF1 is confined within the light guide LG1, and its incidence on the display panel PNL is suppressed. In the first area A1, the light L1 from the light source LS1 is hardly made incident on the display panel PNL, but the light L2 from the light source LS2 illuminates the display panel PNL. The second area A2 is separated from the side surface SF1 in a distance sufficient for the light L1 to be mutually mixed. For this reason, in the second area A2, the degradation of display quality (illumination quality) resulting from non-uniformity in luminance and chromaticity deviation of the illumination light can be suppressed.

Similarly, in the area where the reflective layer P2 is not provided, of the second area A2, the light L2 made incident from the side surface SF3 is confined within the light guide LG2 and its incidence on the display panel PNL is suppressed. In the second area A2, the light L2 from the light source LS2 is hardly made incident on the display panel PNL, but the light L1 from the light source LS1 illuminates the display panel PNL. The first area A1 is separated from the side surface SF4 in a distance sufficient for the light L2 to be mutually mixed. For this reason, in the first area A1, the degradation of display quality (illumination quality) resulting from non-uniformity in luminance and chromaticity deviation of the illumination light can be suppressed.

Furthermore, the reflective layer P1 extends to the first area A1 beyond the boundary BO and the reflective layer P2 extends to the second area A2 beyond the boundary BO. For this reason, the situation where the luminance level of the light emitted from the illumination device IL decreases in the vicinity of the boundary BO can be avoided. When the end portion E11 of the reflective layer P1 and the end portion E21 of the reflective layer P2 are located at the boundary BO, the luminance level of the light emitted from the illumination device IL may be lowered in the vicinity of the boundary BO.

Figure 4:
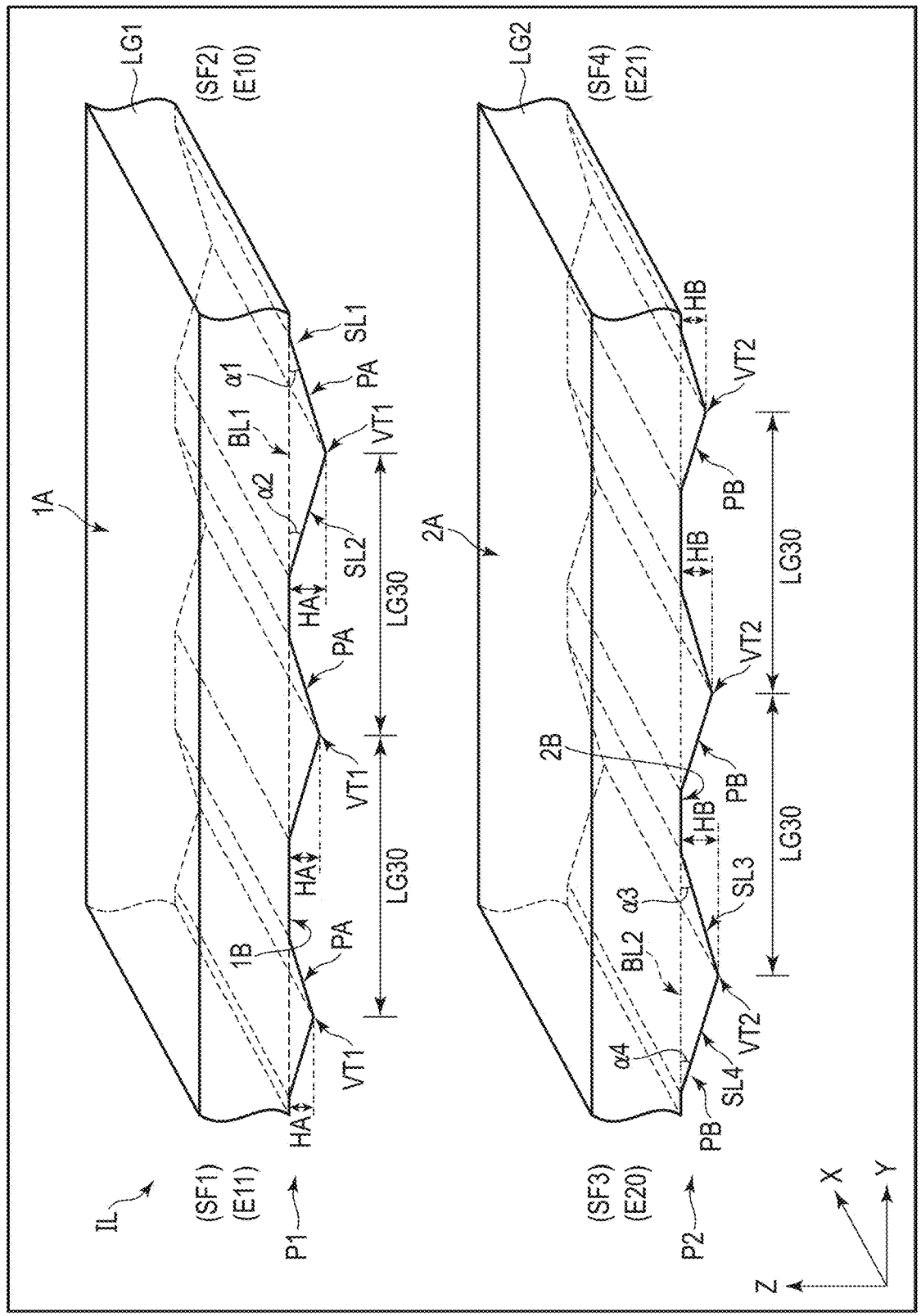
FIG. 4 is a perspective view showing an example of a configuration of each of reflective layers.

FIG. 4 is a perspective view showing an example of a configuration of the reflective layer P1 and the reflective layer P2. FIG. 4 corresponds to FIG. 3. Constituent elements necessary for explanations alone are shown in FIG. 4.

In the example shown in FIG. 4, the reflective layer P1 includes a plurality of prisms PA (first prisms). In the reflective layer P1, the plurality of prisms PA are intermittently arranged in the direction Y. The reflective layer P2 includes a plurality of prisms PB (second prisms). In the reflective layer P2, the plurality of prisms PB are intermittently arranged in the direction Y. The plurality of prisms PA are provided on the opposed surface 1B. The plurality of prisms PB are provided on the opposed surface 2B. For example, the prisms PA are formed integrally with the light guide LG1. Similarly, the prisms PB are formed integrally with the light guide LG2.

The prisms PA protrude from the opposed side 1B toward the main surface 2A. In other words, the prisms PA protrude toward the side opposite to the tip side of the arrow indicating the direction Z. The prisms PA have a triangular cross-sectional shape parallel to the Y-Z plane and extend in the direction X. For example, the cross-sectional shapes of the respective prisms PA parallel to the Y-Z plane are similar to each other. The prism PA has a slope SL1 (first slope), a slope SL2 (second slope), a reference plane BL1, and a vertex VT1. A height HA of the prism PA is a height of the prism PA in the normal direction of the reference plane BL1 (opposed surface 1B), and corresponds to a length in the direction Z from the reference plane BL1 to the vertex VT1.

In the prism PA, the slope SL1 is located on the side surface SF2, and the slope SL2 is located on the side surface SF1 side. The reference plane BL1 is located on the same plane as the opposed surface 1B. The vertex VT1 corresponds to a point where the slope SL1 and the slope SL2 intersect.

A plurality of vertices VT1 are arranged at regular intervals LG30 in the direction Y. The interval LG30 is, for example, 0.1 mm. In the example shown in FIG. 4, an angle $\alpha 1$ formed between the slope SL1 and the reference plane BL1 is equal to an angle $\alpha 2$ formed between the slope SL2 and the reference plane BL1. The angle $\alpha 1$ corresponds to one of internal angles in the cross-section of the prism PA, and the angle $\alpha 2$ corresponds to one of the internal angles in the cross-section of the prism PA other than the angle $\alpha 1$. The angle $\alpha 1$ and the angle $\alpha 2$ may be referred to as prism angles of the prism PA. The cross-section of the prism PA is shaped in an isosceles triangle. The cross-section of the prism PA may not be shaped in an isosceles triangle.

In the example shown in FIG. 4, the height HA of each of the plurality of prisms PA becomes smaller from the side surface SF2 toward the side surface SF1. In other words, the height HA of each of the plurality of prisms PA becomes larger as the prism PA is farther from the light source LS1. The height HA of each of the plurality of prisms PA may be the same. In the direction Y, the ratio of the prism PA (reference plane BL1) per unit area in the X-Y plane increases and the ratio of the opposed surface 1B per unit area in the X-Y plane decreases, from the end portion E11 toward the end portion E10. In contrast, when light traveling in the light guide LG1 progresses to the prism PA of the reflective layer P1 and is emitted from the light guide LG1, the amount of light traveling in the light guide LG1 decreases. As a result, the illumination device IL can irradiate the display panel PNL with the illumination light that has uniform luminance distribution in the second area A2.

The prism PB protrudes from the opposed surface 2B toward the reflective sheet RS. In other words, the prism PB protrudes toward the side opposite to the tip side of the arrow indicating the direction Z. The prisms PB have a triangular cross-sectional shape parallel to the Y-Z plane and extend in the direction X. For example, the cross-sectional shapes of the respective prisms PA parallel to the Y-Z plane are similar to each other. The prism PB has a slope SL3 (third slope), a slope SL4 (fourth slope), a reference plane BL2, and a vertex VT2. A height HB of the prism PB is a height of the prism PB in the normal direction of the reference plane BL2 (opposed surface 2B), and corresponds to a length in the direction Z from the reference plane BL2 to the vertex VT2.

In the prism PB, the slope SL3 is located on the side surface SF4 side, and the slope SL4 is located on the side surface SF3 side. The reference plane BL2 is located on the same plane as the opposed surface 2B. The vertex VT2 corresponds to a point where the slopes SL3 and the slope SL4 intersect.

The plurality of vertices VT2 are arranged at regular intervals LG30 in the direction Y. In the example shown in FIG. 4, an angle $\alpha 3$ formed by the slope SL3 and the reference plane BL2 is equal to an angle $\alpha 4$ formed by the slope SL4 and the reference plane BL2. The angle $\alpha 3$ corresponds to one of internal angles in the cross-section of the prism PB, and the angle $\alpha 4$ corresponds to one of the internal angles in the cross-section of the prism PB other than the angle $\alpha 3$. The angle $\alpha 3$ and the angle $\alpha 4$ may be referred to as prism angles of the prism PB. The cross-section of the prism PB is shaped in an isosceles triangle. The cross-section of the prism PB may not be shaped in an isosceles triangle.

In the example shown in FIG. 4, the height HB of each of the plurality of prisms PB is made smaller from the side surface SF3 toward the side surface SF4. In other words, the height HB of each of the plurality of prisms PB becomes larger as the prism PB is farther from the light source LS2. The height HB of each of the plurality of prisms PB may be the same. In the direction Y, the ratio of the prism PB (reference plane BL2) per unit area in the X-Y plane increases and the ratio of the opposed surface 2B per unit area in the X-Y plane decreases, from the end portion E21 toward the end portion E20. In contrast, when light traveling in the light guide LG2 progresses to the prism PB of the reflective layer P2 and is emitted from the light guide LG2, the amount of light traveling in the light guide LG2 decreases. As a result, the illumination device IL can irradiate the display panel PNL with the illumination light that has uniform luminance distribution in the first area A1.

Figure 5:
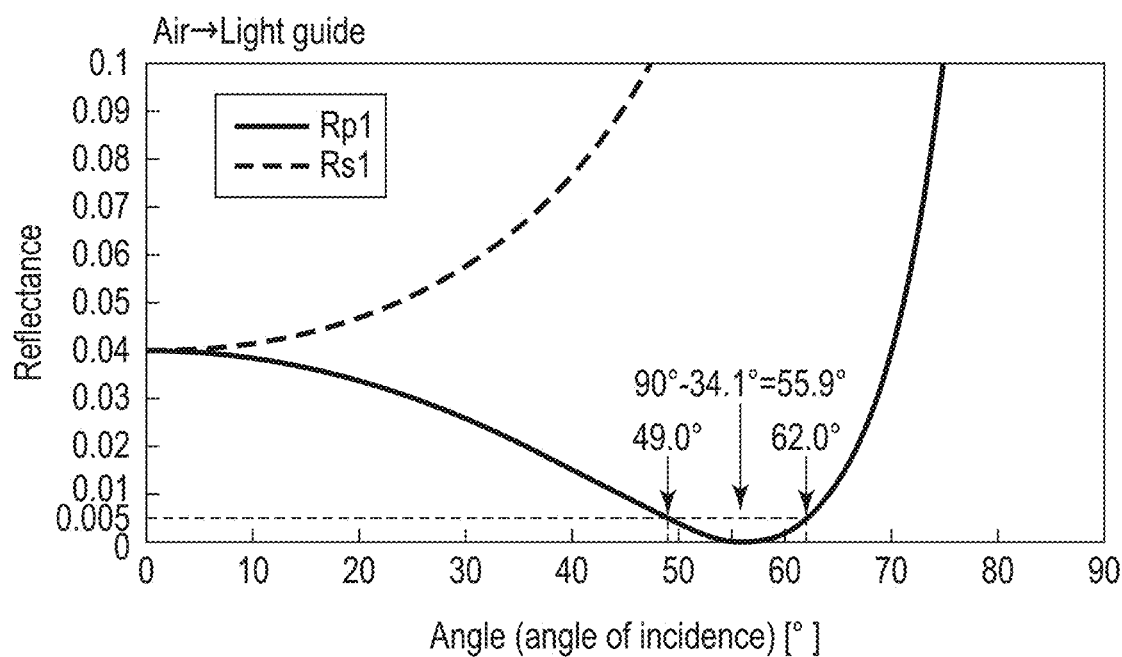
FIG. 5 is a schematic diagram showing an example of the change in reflectance of S-polarized light and P-polarized light with respect to angles of incidence of the S-polarized light and P-polarized light made incident on a light guide from air.

FIG. 5 is a schematic diagram showing an example of the change in reflectance of S-polarized light and P-polarized light with respect to angles of incidence of the S-polarized light and P-polarized light made incident on a light guide from air. In FIG. 5, the vertical axis indicates the reflectance of light, and the horizontal axis indicates the angle of incidence of light [° (degree)]. FIG. 5 shows a change in reflectance Rp1 of the P-polarized light to the angle of incidence of the P-polarized light made incident on a light guide formed of the same material as the light guides LG1 and LG2 from air (hereinafter often referred to as a change in reflectance of the P-polarized light made incident on the light guide from air), and a change in reflectance Rs1 of the S-polarized light to the angle of incidence of the S-polarized light made incident on a light guide formed of the same material as the light guides LG1 and LG2 from air (hereinafter often referred to as a change in reflectance of the S-polarized light made incident on the light guide from air). The P-polarized light corresponds to a component of light whose electric vector oscillates in the plane of incidence. The S-polarized light corresponds to a component of the light whose electric vector oscillates perpendicularly to the plane of incidence.

In the example shown in FIG. 5, the change in reflectance Rp1 of the P-polarized light made incident on the light guide from air becomes smaller as the angle of incidence of the P-polarized light made incident on the light guide from air changes from 0° to 55.9°. In other words, the reflectance of the P-polarized light made incident on the light guide from air becomes smaller as the angle in incidence of the P-polarized light made incident on the light guide from air becomes from 0° to 55.9°.

In the example shown in FIG. 5, when the angle of incidence of the P-polarized light made incident on the light guide from air is 55.9°, the change in reflectance Rp1 of the P-polarized light made incident on the light guide from air is zero. In other words, when the angle of incidence of the P-polarized light made incident on the light guide from air is 55.9°, the reflectance of the P-polarized light made incident on the light guide from air is 0. In other words, when the angle of incidence of the P-polarized light made incident on the light guide from air is 55.9°, the P-polarized light made incident on the light guide from air is not reflected at all at the boundary between the air and the light guide, but is entirely made incident on the light guide from air. The angle of incidence at which the reflectance (or the reflection intensity) of the P-polarized light thus becomes zero (0%) is referred to as the Brewster's angle. In the example shown in FIG. 5, when the P-polarized light is made incident on the light guide from air, the Brewster's angle is 55.9°.

In the example shown in FIG. 5, the change in reflectance Rp1 of the P-polarized light made incident on the light guide from air is larger as the angle of incidence of the P-polarized light made incident on the light guide from air becomes larger than 55.9°. In other words, the reflectance of the P-polarized light made incident on the light guide from air becomes larger as the angle of incidence of the P-polarized light made incident on the light guide from air becomes larger than 55.9°.

In addition, when the angle of incidence of the P-polarized light made incident on the light guide from air is in a range of 49.0° or more and 62.0° or less, then the reflectance of the P-polarized light made incident on the light guide from air is 0.005 (0.5%) or less. In other words, when the angle of incidence of the P-polarized light made incident on the light guide from air is in a range of 49.0° or more and 62.0° or less, the P-polarized light made incident on the light guide from air is not substantially reflected at the boundary between the air and the light guide, but is substantially made incident on the light guide from air.

In the example shown in FIG. 5, the change in reflectance Rs1 of the S-polarized light made incident on the light guide from air becomes larger as the angle of incidence of the S-polarized light made incident on the light guide from air becomes larger than 0°. In other words, the reflectance of the S-polarized light made incident on the light guide from air becomes larger as the angle of incidence of the S-polarized light made incident on the light guide from air becomes larger than 0°. In other words, the rate of reflection of the S-polarized light made incident on the light guide from air, at the boundary between the air and the light guide becomes larger as the angle of incidence of the S-polarized light made incident on the light guide from air becomes larger than 0°.

Figure 6:
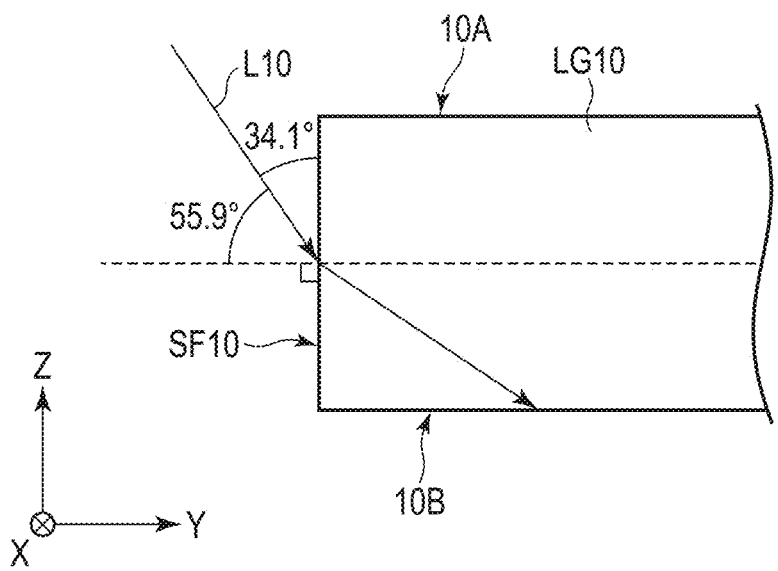
FIG. 6 is a schematic diagram showing an example of the P-polarized light made incident from air to the light guide.

FIG. 6 is a schematic diagram showing an example of the P-polarized light made incident on a light guide LG10 from air. The light guide LG10 formed of the same material as the light guides LG1 and LG2 is shown in FIG. 6. The light guide LG10 is formed in a flat plate shape parallel to the X-Y plane. The light guide LG10 has an upper main surface 10A, an opposed surface 10B located on a side opposite to the main surface 10A in the direction Z, and a side surface SF10. The main surface 10A and the opposed surface 10B are, for example, parallel to the X-Y plane and are provided parallel to each other. The main surface 10A and the opposed surface 10B may be non-parallel to each other. The side surface SF10 is, for example, parallel to the X-Z plane. P-polarized light L10 made incident on the light guide LG10 from air is shown in FIG. 6.

In the example shown in FIG. 6, the P-polarized light L10 is made incident on the light guide LG10 from air at an angle of incidence=55.9°. In other words, the P-polarized light L10 is made incident on the side surface SF10 of the light guide LG10 from air at the angle of incidence=55.9° with respect to a straight line perpendicular to the side surface SF10. As represented by the change in reflectance Rp1 of the P-polarized light made incident on the light guide from air in FIG. 5, when the P-polarized light L10 is made incident on the side surface SF10 of the light guide LG10 from air at an angle of incidence (Brewster's angle)=55.9°, the P-polarized light L10 is not reflected on the side surface SF10, but is entirely made incident on the light guide LG10. In other words, when the P-polarized light L10 is made incident on the side surface SF10 at an angle=55.9° to a straight line perpendicular to the side surface SF10, the P-polarized light L10 is not reflected on the side surface SF10, but is entirely made incident on the light guide LG10.

Figure 7:
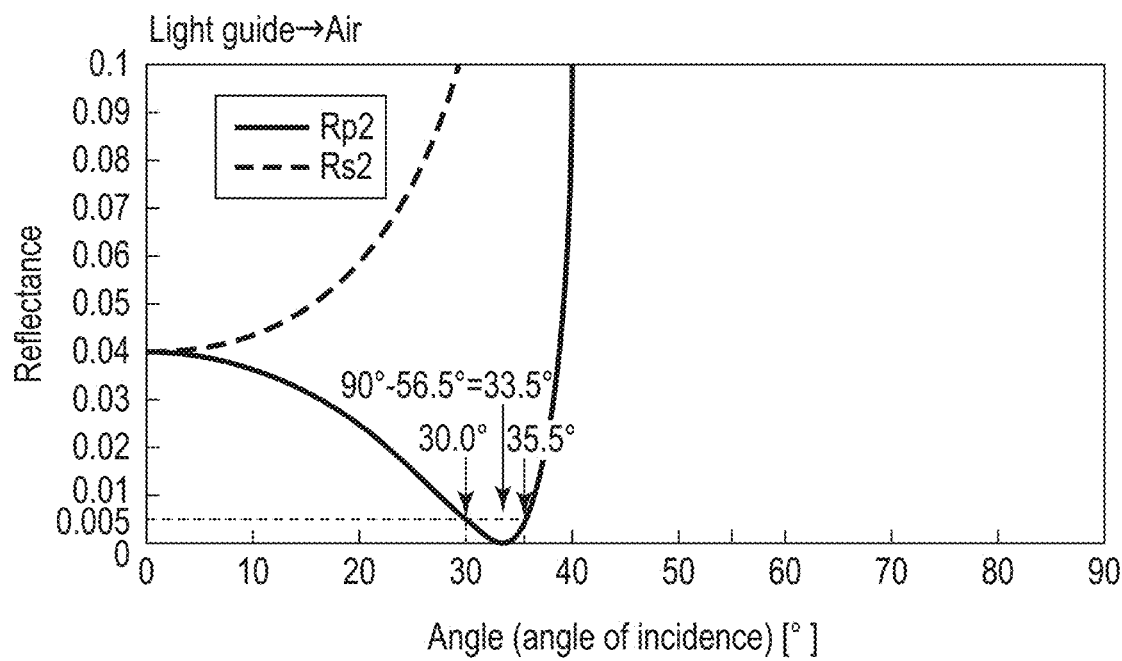
FIG. 7 is a schematic diagram showing an example of the change in reflectance of the S-polarized light and the P-polarized light with respect to angles of incidence of the S-polarized light and the P-polarized light made incident on the light guide from air.

FIG. 7 is a schematic diagram showing an example of the change in reflectance of the S-polarized light and the P-polarized light with respect to the angles of incidence of the S-polarized light and the P-polarized light made incident on the light guide from air. In FIG. 7, the vertical axis indicates the reflectance of light, and the horizontal axis indicates the angle of incidence of light [°]. FIG. 7 shows a change in reflectance Rp2 of the P-polarized light to the angle of incidence of the P-polarized light made incident on air from a light guide formed of the same material as the light guides LG1 and LG2 (hereinafter often referred to as a change in reflectance of the P-polarized light made incident on air from the light guide), and a change in reflectance Rs2 of the S-polarized light to the angle of incidence of the S-polarized light made incident on air from a light guide formed of the same material as the light guides LG1 and LG2 (hereinafter often referred to as a change in reflectance of the S-polarized light made incident on air from the light guide).

In the example shown in FIG. 7, the change in reflectance Rp2 of the P-polarized light made incident on air from the light guide becomes smaller as the angle of incidence of the P-polarized light made incident on air from the light guide changes from 0° to 33.5°. In other words, the reflectance of the P-polarized light made incident on air from the light guide becomes smaller as the angle of incidence of the P-polarized light made incident on air from the light guide changes from 0° to 33.5°.

In the example shown in FIG. 7, when the angle of incidence of the P-polarized light made incident on air from the light guide is 33.5°, the change in reflectance Rp2 of the P-polarized light made incident on air from the light guide becomes 0. In other words, when the angle of incidence of the P-polarized light made incident on air from the light guide is 33.5°, the reflectance of the P-polarized light made incident on air from the light guide becomes 0. In other words, when the angle of incidence of the P-polarized light made incident on air from the light guide is 33.5°, the P-polarized light made incident on air from the light guide is not reflected at all at the boundary between the light guide and air, but is entirely made incident on air from the light guide. In the example shown in FIG. 6, when the P-polarized light is made incident on air from the light guide, the Brewster's angle is 33.5°.

In the example shown in FIG. 7, the change in reflectance Rp2 of the P-polarized light made incident on air from the light guide is larger as the angle of incidence of the P-polarized light made incident on air from the light guide becomes larger than 33.5°. In other words, the reflectance of the P-polarized light made incident on air from the light guide is larger as the angle of incidence of the P-polarized light made incident on air from the light guide becomes larger than 33.5°.

In addition, when the angle of incidence of the P-polarized light made incident on air from the light guide is in the range of 30.0° or more and 35.5° or less, the reflectance of the P-polarized light made incident on air from the light guide is 0.005 or less. In other words, when the angle of incidence of the P-polarized light made incident on air from the light guide is in the range of 30.0° or more and 35.5° or less, the P-polarized light made incident on air from the light guide is not substantially reflected at the boundary between the light guide and the air, but is substantially made incident on air from the light guide.

In the example shown in FIG. 7, the change in reflectance Rs2 of the S-polarized light made incident on air from the light guide is larger as the angle of incidence of the S-polarized light made incident on air from the light guide becomes larger than 0°. In other words, the reflectance of the S-polarized light made incident on air from the light guide is larger as the angle of incidence of the S-polarized light made incident on air from the light guide becomes larger than 0°. In other words, the rate of reflection of the S-polarized light made incident on air from the light guide, at the boundary between the light guide and air becomes larger as the angle of incidence of the S-polarized light made incident on air from the light guide becomes larger than 0°.

Figure 8:
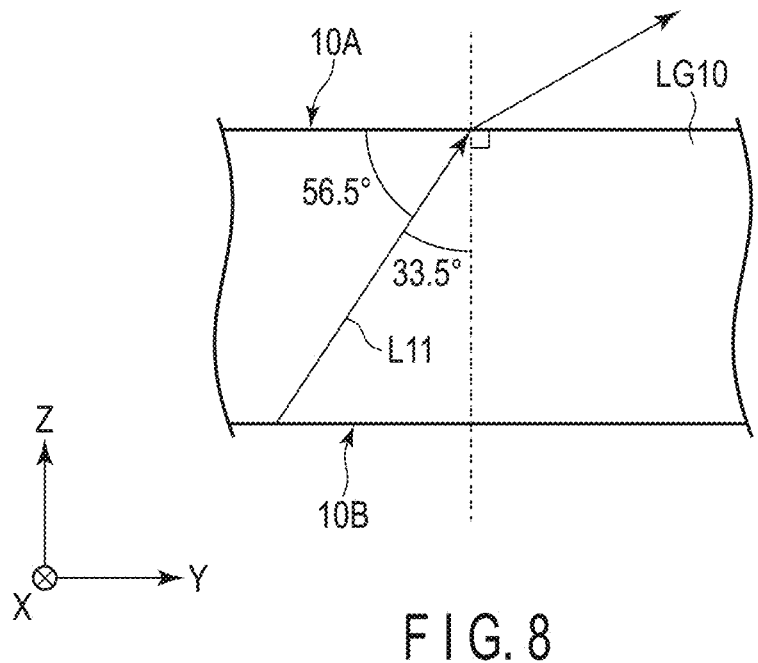
FIG. 8 is a schematic diagram showing an example of P-polarized light made incident from the light guide to air.

FIG. 8 is a schematic diagram showing an example of the P-polarized light made incident on air from the light guide LG10. The light guide LG10 is shown in FIG. 8. P-polarized light L11 made incident on air from the light guide LG10 is shown in FIG. 8.

In the example shown in FIG. 8, the P-polarized light L11 is made incident on air from the light guide LG10 at an angle of incidence=33.5°. In other words, the P-polarized light L11 is made incident on the main surface 10A at the angle of incidence=33.5° with respect to a straight line perpendicular to the main surface 10A, from the light guide LG10 to air. As indicated by the change in reflectance Rp2 of the P-polarized light made incident on air from the light guide in FIG. 8, when the P-polarized light L11 is made incident on air from the light guide LG10 at an angle of incidence (Brewster's angle)=33.5° from the main surface 10A, the P-polarized light L11 is not reflected on the main surface 10A, but is entirely made incident on air. In other words, when the P-polarized light L10 is made incident on the main surface 10A at an angle=33.5° to a straight line perpendicular to the main surface 10A, the P-polarized light L11 is not reflected on the main surface 10A, but is entirely made incident on air.

Figure 9:
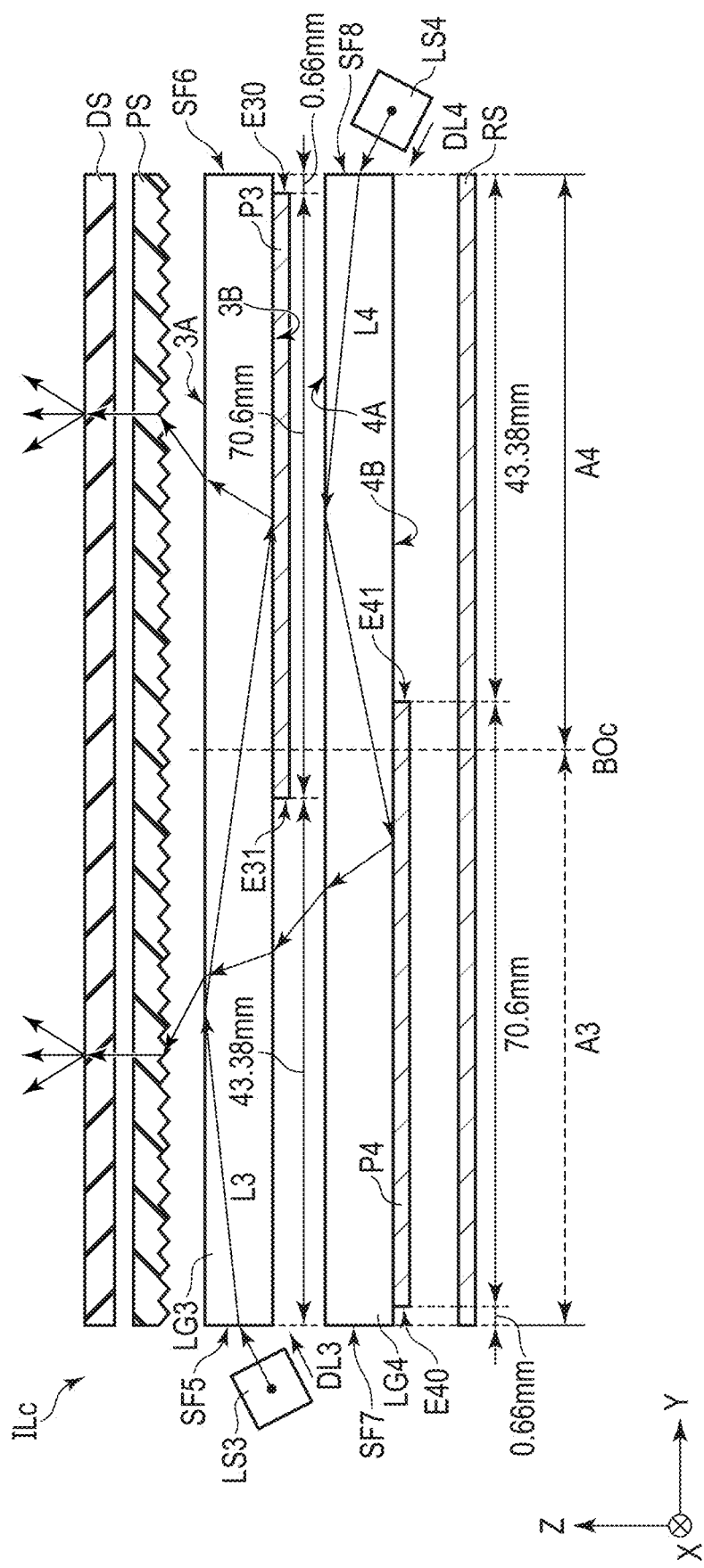
FIG. 9 is a cross-sectional view showing a configuration example of an illumination device of a comparative example.

FIG. 9 is a cross-sectional view showing a configuration example of an illumination device ILc of a comparative example. As shown in FIG. 9, the illumination device ILc of the comparative example has a third area A3, a fourth area A4, and a boundary BOc between the third area A3 and the fourth area A4. A length of the third area A3 in the direction Y is equal to a length of the fourth area A4 in the direction Y. The length of the third area A3 in the direction Y may not be equal to the length of the fourth area A4 in the direction Y.

The illumination device ILc comprises a diffusion sheet DS, a prism sheet PS, a light guide LG3, a plurality of light sources LS3, a reflective layer P3, a light guide LG4, a plurality of light sources LS4, a reflective layer P4, and a reflective sheet RS. The reflective sheet RS, the reflective layer P4, the light guide LG4, the reflective layer P3, the light guide LG3, the prism sheet PS, and the diffusion sheet DS are arranged in the mentioned order toward the tip side of the arrow indicating the direction Z.

The diffusion sheet DS is located on the light guide LG3. The prism sheet PS is located between the diffusion sheet DS and the light guide LG3. For example, the prism sheet PS focuses light emitted from the light guide LG3, in the direction Z.

The light guide LG3 is an insulating substrate such as a glass substrate or a plastic substrate. The light guide LG3 is formed of, for example, the same material as the light guides LG1 and LG2. The light guide LG3 is formed in a flat plate shape parallel to the X-Y plane. The light guide LG3 has a main surface 3A opposed to the display panel PNL, an opposed surface 3B located on a side opposite to the main surface 3A in the direction Z, a side surface SF5, and a side surface SF6 located on a side opposite to the side surface SF5 in the direction Y. The main surface 3A and the opposed surface 3B are, for example, parallel to the X-Y plane and are provided parallel to each other. The main surface 3A and the opposed surface 3B may be non-parallel to each other. The side surfaces SF5 and SF6 are, for example, parallel to the X-Z plane and are provided parallel to each other. The side surfaces SF5 and SF6 may be non-parallel to each other.

The light guide LG3 is located in the entire third area A3 and the entire fourth area A4. In other words, the main surface 3A and the opposed surface 3B shown in FIG. 9 are located in the third area A3 and the fourth area A4. The side surface SF5 is located in the third area A3, and the side surface SF6 is located in the fourth area A4. The boundary BOc corresponds to a middle part between the side surface SF5 and the side surface SF6.

A plurality of light sources LS3 are arranged at intervals in the direction X. In the example shown in FIG. 9, the plurality of light sources LS3 are opposed to the side surface SF5. In addition, the plurality of light sources LS3 are spaced apart in the direction X and arranged along the side surface SF5.

The light sources LS3 are separated from the side surface SF5. The light sources LS3 emit light L3 toward the side surface SF5 in the emission direction DL3. The emission direction DL3 of the light sources LS3 is the direction that intersects a line parallel to a center line passing the center of the thickness of the light guide LG3 and extending in the direction Y.

The reflective layer P3 is a layer including a plurality of prisms, which will be described below in detail. The reflective layer P3 is located on the opposed surface 3B. The length of the reflective layer P3 in the direction Y is 70.6 mm. The reflective layer P3 extends from the fourth area A4 to a predetermined position between the boundary BOc and the side surface SF5 beyond the boundary BOc, in the direction Y. The reflective layer P3 may extend within the fourth area A4. The reflective layer P3 includes an end portion E30 on the tip side of the arrow indicating the direction Y and an end portion E31 on the side opposite to the end portion E10 in the direction Y. The end portion E30 is separated from the side surface SF6 to a side opposite to the tip side of the arrow indicating the direction Y by 0.66 mm. The end portion E31 is located between the side surface SF5 and the boundary BOc. The end portion E31 is located on the boundary BOc side between the side surface SF5 and the boundary BOc. The end portion E31 is located near the boundary BOc. The end portion E31 is located between the boundary BOc and the side surface SF6. For example, the end portion E30 corresponds to the position of the prism closest to the side surface SF6, of the plurality of prisms included in the reflective layer P3 (prisms PC to be described below). For example, the end portion E31 corresponds to the position of the prism closest to the side surface SF5, of the plurality of prisms included in the reflective layer P3 (prisms PC to be described below).

The light guide LG4 is an insulating substrate such as a glass substrate or a plastic substrate. The light guide LG4 is formed of, for example, the same material as the light guide LG3. The light guide LG4 may not be formed of the same material as the light guide LG3. The light guide LG4 is formed in a flat plate shape parallel to the X-Y plane. The light guide LG4 has a main surface 4A opposed to the opposed surface 3B, an opposed surface 4B located on a side opposite to the main surface 4A in the direction Z, a side surface SF7 arranged with the side surface SF5 in the direction Z, and a side surface SF8 located on a side opposite to the side surface SF7 in the direction Y and arranged with the side surface SF6 in the direction Z. The main surface 4A and the opposed surface 4B are, for example, parallel to the X-Y plane and are provided parallel to each other. The main surface 4A and the opposed surface 4B may be non-parallel to each other. The side surface SF7 and the side surface SF8 are opposed to each other in the direction Y. The side surfaces SF7 and SF8 are, for example, parallel to the X-Z plane and are provided parallel to each other. The side surfaces SF7 and SF8 may be non-parallel to each other.

The light guide LG4 is located in the entire third area A3 and the entire fourth area A4. In other words, the main surface 4A and the opposed surface 4B shown in FIG. 9 are located in the third area A3 and the fourth area A4. The side surface SF7 is located in the third area A3, and the side surface SF8 is located in the fourth area A4. The boundary BOc corresponds to a middle part between the side surface SF7 and the side surface SF8.

The plurality of light sources LS4 are arranged at intervals in the direction X. In the example shown in FIG. 1, the plurality of light sources LS4 are opposed to the side surface SF8. In addition, the plurality of light sources LS4 are spaced apart in the direction X and arranged along the side surface SF8.

The light sources LS4 are separated from the side surface SF8. The light sources LS4 emit light L4 toward the side surface SF8 in the emission direction DL4. The emission direction DL4 of the light sources LS4 is the direction that intersects a line parallel to a center line passing the center of the thickness of the light guide LG4 and extending in the direction Y.

The light sources LS3 and LS4 are, for example, laser light sources such as semiconductor lasers that emit polarized laser light. The light sources LS3 and LS4 are not limited to the light sources emitting laser light, but may be, for example, light emitting diodes.

The light sources LS3 and LS4 may comprise a plurality of light emitting elements that emit light of different colors. For example, each of the light sources LS3 and LS4 comprises three light emitting elements that emit red, green, and blue light, respectively. When comprising three light emitting elements that emit red, green, and blue light, the light sources LS3 and LS4 can obtain light of a mixture of these colors (for example, white color).

The reflective layer P4 is a layer including a plurality of prisms, which will be described below in detail. The reflective layer P4 is located on the opposed side 4B. The length of the reflective layer P4 in the direction Y is 70.6 mm. The reflective layer P4 extends from the third area A3 to a predetermined position between the boundary BOc and the side surface SF8 beyond the boundary BOc, in the direction Y. The reflective layer P4 may extend within the fourth area A4. The reflective layer P4 includes an end portion E40 on a side opposite to the tip side of the arrow indicating the direction Y and an end portion E41 on a side opposite to the end portion E40 in the direction Y. The end portion E40 is separated from the side surface SF7 to the tip side of the arrow indicating the direction Y by 0.66 mm. The end portion E41 is located between the boundary BOc and the side surface SF8. The end portion E41 is located on the boundary BOc side between the boundary BOc and the side surface SF8. The end portion E41 is located near the boundary BOc. The end portion E41 may be located between the boundary BOc and the side surface SF7. For example, the end portion E40 corresponds to the position of the prism closest to the side surface SF7, of the plurality of prisms included in the reflective layer P4 (prisms PD to be described below). For example, the end portion E41 corresponds to the position of the prism closest to the side surface SF8, of the plurality of prisms included in the reflective layer P4 (prisms PD to be described below).

The reflective layer P3 and the reflective layer P4 overlap with each other in the direction Z in the boundary BOc and the vicinity of the boundary BOc. The reflective layer P3 and the reflective layer P4 may not overlap with each other in the direction Z in the boundary BOc and the vicinity of the boundary BOc.

The reflective sheet RS is opposed to the opposed surface 4B of the light guide LG4. For example, the reflective sheet RS reflects the light leaking from within the light guide LG4 and makes the light incident on the light guide LG4 again. The reflective sheet RS may not be provided.

The light L3 emitted from the light sources LS3 is not reflected at the interface between the side surface SF5 and the air layer, but is made incident on the light guide LG3 from the side surface SF5 and is refracted on the side surface SF5. Light traveling toward the opposed surface 3B, of the light L3 made incident on the light guide LG3 is reflected at the interface between the light guide LG3 and the air layer. In addition, light traveling toward the main surface 3A, of the light L3 made incident on the light guide LG3 is reflected at the interface between the light guide LG3 and the air layer. Thus, in the area where the reflective layer P3 is not provided, of the third area A3, the light L3 travels toward the tip side of the arrow indicating the direction Y, inside the light guide LG3, while repeatedly reflected on the main surface 3A and the opposed surface 3B.

Light traveling toward the reflective layer P3, of the light L3 traveling inside the light guide LG3, is reflected on the prisms of the reflective layer P3 such that its traveling direction is changed. The light reflected on the prisms of the reflective layer P3 deviates from the total reflection condition of the main surface 3A and is emitted from the main surface 3A. The light emitted from the main surface 3A illuminates the display panel PNL through the prism sheet PS and the diffusion sheet DS. In other words, in the area where the reflective layer P3 is not provided (or the area close to the side surface SF5), of the third area A3, emission of the light L3 incident from the side surface SF5, from the light guide LG3, is suppressed.

Similarly, the light L4 emitted from the light sources LS4 is not reflected at the interface between the side surface SF8 and the air layer, but is made incident on the light guide LG4 from the side surface SF8 and is refracted on the side surface SF8. Light traveling toward the opposed surface 4B, of the light L4 made incident on the light guide LG4 is reflected at the interface between the light guide LG4 and the air layer. In addition, light traveling toward the main surface 4A, of the light L4 made incident on the light guide LG4 is reflected at the interface between the light guide LG4 and the air layer. Thus, in the area where the reflective layer P4 is not provided, of the fourth area A4, the light L4 travels toward a side opposite to the tip side of the arrow indicating the direction Y, inside the light guide LG4, while repeatedly reflected on the main surface 4A and the opposed surface 4B.

The light L4 traveling toward the reflective layer P4, of the light L4 traveling inside the light guide LG4, is reflected on the prisms of the reflective layer P4 such that its traveling direction is changed. The light reflected on the prisms of the reflective layer P4 deviates from the total reflection condition of the main surface 4A and is emitted from the main surface 4A. The light emitted from the main surface 4A illuminates the display panel PNL through the light guide LG3, the prism sheet PS, and the diffusion sheet DS.

Figure 10:
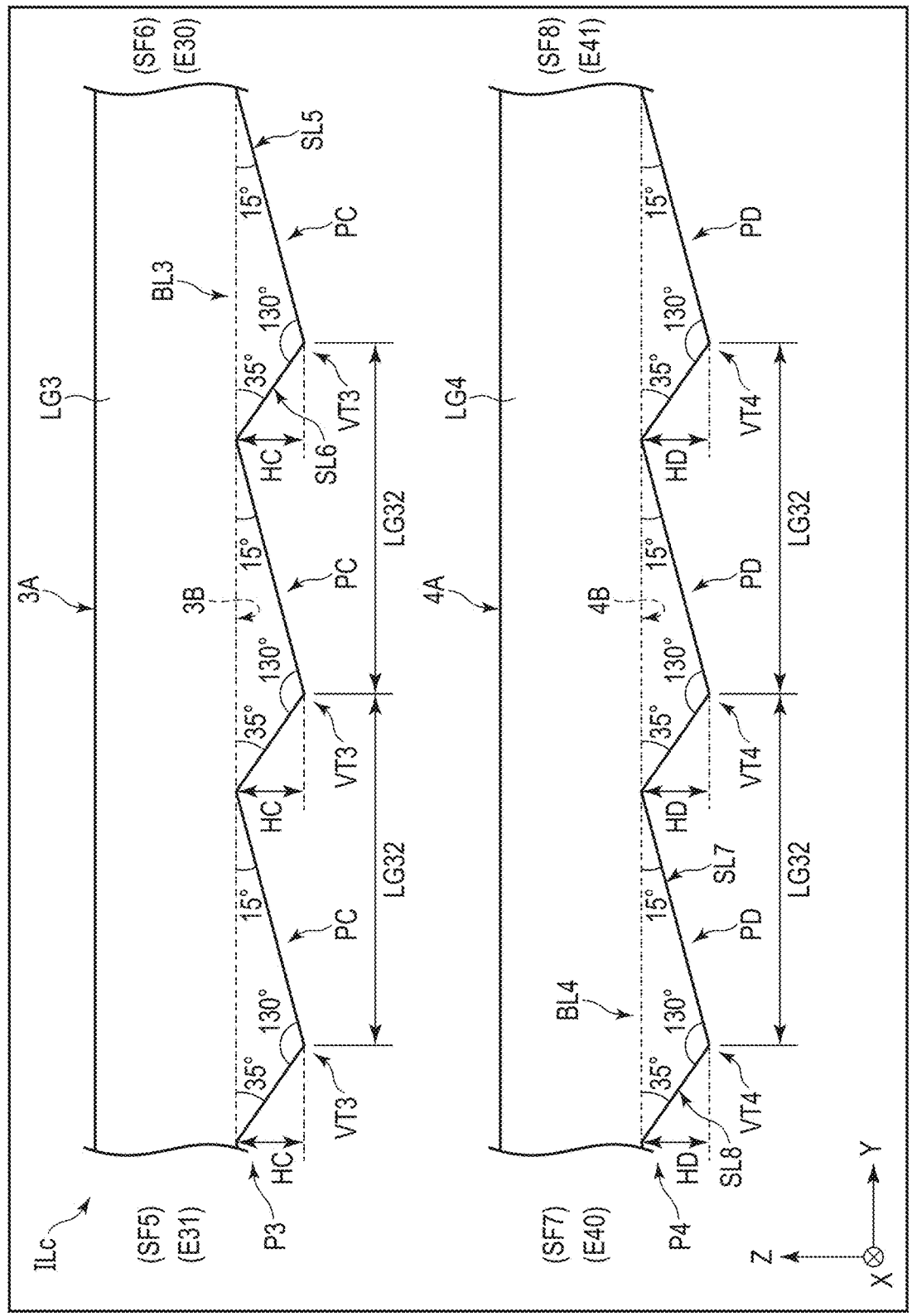
FIG. 10 is a perspective view showing an example of a configuration of each of reflective layers corresponding to the illumination device of FIG. 9.

FIG. 10 is a perspective view showing an example of the configuration of the reflective layer P3 and the reflective layer P4, which corresponds to the illumination device ILc of FIG. 9. FIG. 10 corresponds to FIG. 9. The only constituent elements necessary for explanations are shown in FIG. 10.

In the example shown in FIG. 10, the reflective layer P3 includes a plurality of prisms PC. In the reflective layer P3, the plurality of prisms PC are intermittently arranged in the direction Y. The reflective layer P4 has a plurality of prisms PD. In the reflective layer P4, the plurality of prisms PD are intermittently arranged in the direction Y. The plurality of prisms PC are provided on the opposed surface 3B. The plurality of prisms PD are provided on the opposed surface 4B. For example, the prisms PC are formed integrally with the light guide LG3. Similarly, the prisms PD are formed integrally with the light guide LG4.

The prisms PC protrude from the opposed surface 3B toward the main surface 4A. In other words, the prisms PC protrude toward the side opposite to the tip side of the arrow indicating the direction Z. The prisms PC have a triangular cross-sectional shape parallel to the Y-Z plane and extend in the direction X. For example, the cross-sectional shapes of the respective prisms PC parallel to the Y-Z plane are similar to each other. The prism PC has a slope SL5, a slope SL6, a reference plane BL3, and a vertex VT3. A height HC of the prism PC is a height of the prism PC in the normal direction of the reference plane BL3 (opposed surface 3B), and corresponds to a length in the direction Z from the reference plane BL3 to the vertex VT3.

In the prism PC, the slope SL5 is located on the side surface SF6 side, and the slope SL6 is located on the side surface SF5 side. The reference plane BL3 is located on the same plane as the opposed surface 3B. The vertex VT3 corresponds to a point where the slopes SL5 and the slope SL6 intersect.

A plurality of vertices VT3 are arranged at regular intervals LG32 in the direction Y. The interval LG32 is, for example, 0.1 mm. In the example shown in FIG. 10, the angle between the slope SL5 and the reference plane BL3 is 15°, and the angle between the slope SL6 and the reference plane BL3 is 35°. The angle between the slope SL5 and the slope SL6 is 130°. R of the tip of apex VT3 is 0.015 mm.

In the example shown in FIG. 10, a height HC of each of the plurality of prisms PC is constant. The height HC of each of the plurality of prisms PC may be smaller from the side surface SF6 toward the side surface SF5. In other words, the height HC of each of the plurality of prisms PC may become higher the farther the prism PC is from the light source LS3.

The prisms PD protrude from the opposed surface 4B toward the reflective sheet RS. In other words, the prisms PD protrude toward the side opposite to the tip side of the arrow indicating the direction Z. The prisms PD have a triangular cross-sectional shape parallel to the Y-Z plane and extend in direction X. For example, the cross-sectional shapes of the respective prisms PD parallel to the Y-Z plane are similar to each other. The prism PD has a slope SL7, a slope SL8, a reference plane BL4, and a vertex VT4. A height HD of the prism PD is a height of the prism PD in the normal direction of the reference plane BL4, and corresponds to a length in the direction Z from the reference plane BL4 to the vertex VT4.

In the prism PD, the slope SL7 is located on the side surface SF8 side, and the slope SL8 is located on the side surface SF7 side. The reference plane BL4 is located on the same plane as the opposed surface 4B. The vertex VT4 corresponds to a point where the slopes SL7 and the slope SL8 intersect.

A plurality of vertices VT4 are arranged at regular intervals LG32 in the direction Y. In the example shown in FIG. 10, the angle formed between the slope SL7 and the reference plane BL4 is 15°, and the angle formed between the slope SL8 and the reference plane BL4 is 35°. The angle formed between the slope SL7 and the slope SL8 is 130°. R of the tip of the vertex VT4 is 0.015 mm.

In the example shown in FIG. 10, the height HD of each of the plurality of prisms PD is constant. The height HC of each of the plurality of prisms PD may be smaller from the side surface SF7 toward the side surface SF8. In other words, the height HC of each of the plurality of prisms PD may be larger as the prism PD is farther from the light sources LS4.

Figure 11:
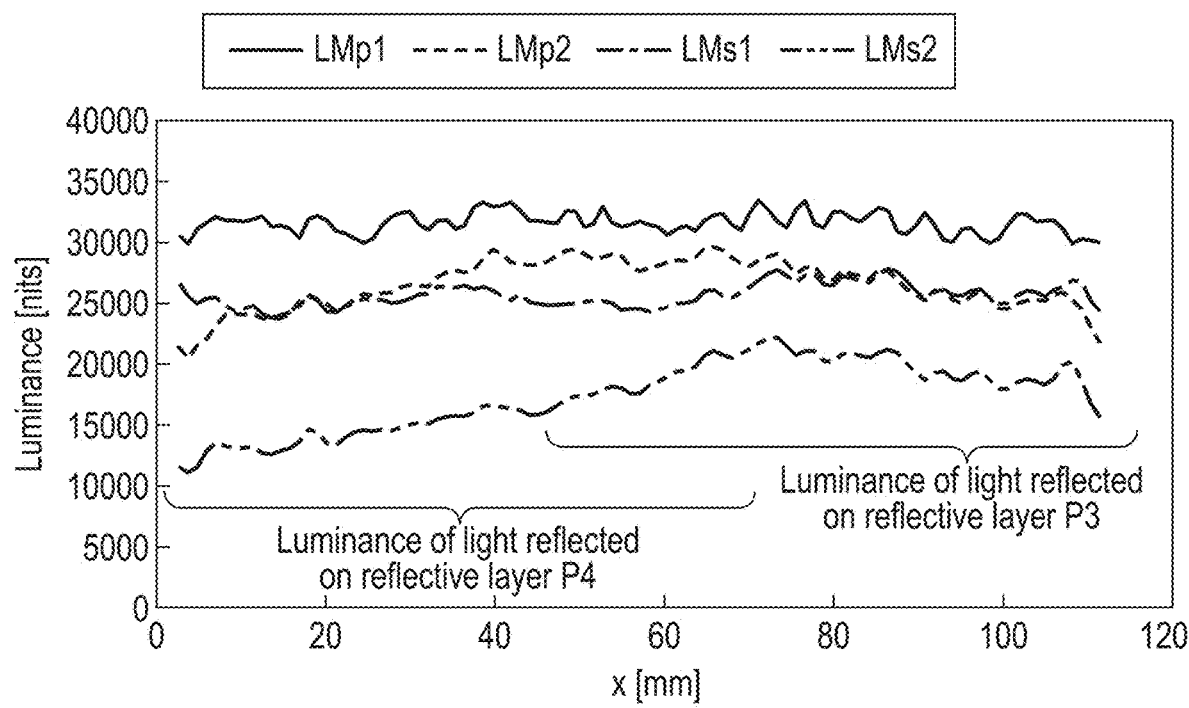
FIG. 11 is a view showing an example of the change in luminance of the illumination device of FIG. 9 in a direction Y with respect to a distance X in a case where P-polarized light and S-polarized light are made incident.

FIG. 11 is a view showing an example of the change in luminance of the illumination device ILc of FIG. 9 in the direction Y with respect to the distance X in a case where the P-polarized light and the S-polarized light are made incident. In FIG. 11, the vertical axis indicates the luminance of the illumination device ILc, and the horizontal axis indicates a distance x[mm] from the side surfaces SF5 and SF7 of the illumination device ILc to the tip side of the arrow indicating the direction Y. FIG. 11 shows a change in luminance LMp1 of the illumination device ILc to the distance x in a case where the P-polarized light is emitted from the light sources LS3 and LS4 in the illumination device ILc including the reflective sheet RS (often referred to as a change in luminance of the illumination device ILc including the reflective sheet RS in a case where the P-polarized light is emitted), a change in luminance LMp2 of the illumination device ILc to the distance x in a case where the P-polarized light is emitted from the light sources LS3 and LS4 in the illumination device ILc not including the reflective sheet RS (often referred to as a change in luminance of the illumination device ILc not including the reflective sheet RS in a case where the P-polarized light is emitted), a change in luminance LMs1 of the illumination device ILc to the distance x in a case where the S-polarized light is emitted from the light sources LS3 and LS4 in the illumination device ILc including the reflective sheet RS (often referred to as a change in luminance of the illumination device ILc including the reflective sheet RS in a case where the S-polarized light is emitted), and a change in luminance LMs2 of the illumination device ILc to the distance x in a case where the S-polarized light is emitted from the light sources LS3 and LS4 in the illumination device ILc not including the reflective sheet RS (often referred to as a change in luminance of the illumination device ILc not including the reflective sheet RS in a case where the S-polarized light is emitted). In FIG. 11, each of the change in luminance LMp1 of the illumination device ILc including the reflective sheet RS in a case where the P-polarized light is emitted, the change in luminance LMp2 of the illumination device ILc not including the reflective sheet RS in a case where the P-polarized light is emitted, the change in luminance LMs1 of the illumination device ILc including the reflective sheet RS in a case where the S-polarized light is emitted, and the change in luminance LMs2 of the illumination device ILc not including the reflective sheet RS in a case where the S-polarized light is emitted, includes the luminance of the light reflected on the reflective layer P3 and the luminance of the light reflected on the reflective layer P4.

In the example shown in FIG. 11, the change in luminance LMp1 of the illumination device ILc including the reflective sheet RS in a case where the P-polarized light is emitted, is larger than the change in luminance LMs1 of the illumination device ILc including the reflective sheet RS in a case where the S-polarized light is emitted, and the change in luminance LMs2 of the illumination device ILc not including the reflective sheet RS in a case where the S-polarized light is emitted. In other words, the luminance of the illumination device ILc including the reflective sheet RS in a case where the P-polarized light is emitted from the light sources LS3 and LS4, is larger than the luminance of the illumination device ILc including the reflective sheet RS in a case where the S-polarized light is emitted from the light sources LS3 and LS4, and the luminance of the illumination device ILc not including the reflective sheet RS in a case where the S-polarized light is emitted from the light sources LS3 and LS4.

The change in luminance LMp2 of the illumination device ILc not including the reflective sheet RS in a case where the P-polarized light is emitted, is substantially equal to the change in luminance LMs1 of the illumination device ILc including the reflective sheet RS in a case where the S-polarized light is emitted. In other words, the luminance of the illumination device ILc not including the reflective sheet RS in a case where the P-polarized light is emitted from the light sources LS3 and LS4, is substantially equal to the luminance of the illumination device ILc including the reflective sheet RS in a case where the S-polarized light is emitted from the light sources LS3 and LS4.

The change in luminance LMs1 of the illumination device ILc including the reflective sheet RS in a case where the S-polarized light is emitted is larger than the change in luminance LMs2 of the illumination device ILc not including the reflective sheet RS in a case where the S-polarized light is emitted. In other words, the luminance of the illumination device ILc including the reflective sheet RS in a case where the S-polarized light is emitted from the light sources LS3 and LS4 is larger than the luminance of the illumination device ILc not including the reflective sheet RS in a case where the S-polarized light is emitted from the light sources LS3 and LS4.

The luminance of the light reflected on the reflective layer P4 is substantially equal to the luminance of the light reflected on the reflective layer P3, in each of the change in luminance LMp1 of the illumination device ILc including the reflective sheet RS in a case where the P-polarized light is emitted and the change in luminance LMp2 of the illumination device ILc not including the reflective sheet RS in a case where the P-polarized light is emitted. In other words, the P-polarized light has a small interface reflection of the emitted light.

The luminance of the light reflected on the reflective layer P4 is substantially equal to the luminance of the light reflected on the reflective layer P3 according to the change in luminance LMs1 of the illumination device ILc including the reflective sheet RS in a case where the S-polarized light is emitted, but the luminance of the light reflected on the reflective layer P4 is smaller than the luminance of the light reflected on the reflective layer P3 according to the change in luminance LMs2 of the illumination device ILc not including the reflective sheet RS in a case where the S-polarized light is emitted. In other words, the S-polarized light has large interface reflection when the emitted light reflected on the reflection layer P4 passes through the light guide LG3.

As described above, as light emitted from the light sources of illumination devices, for example, illumination devices IL and ILc, rather than S-polarized light P-polarized light should be used.

Figure 12:
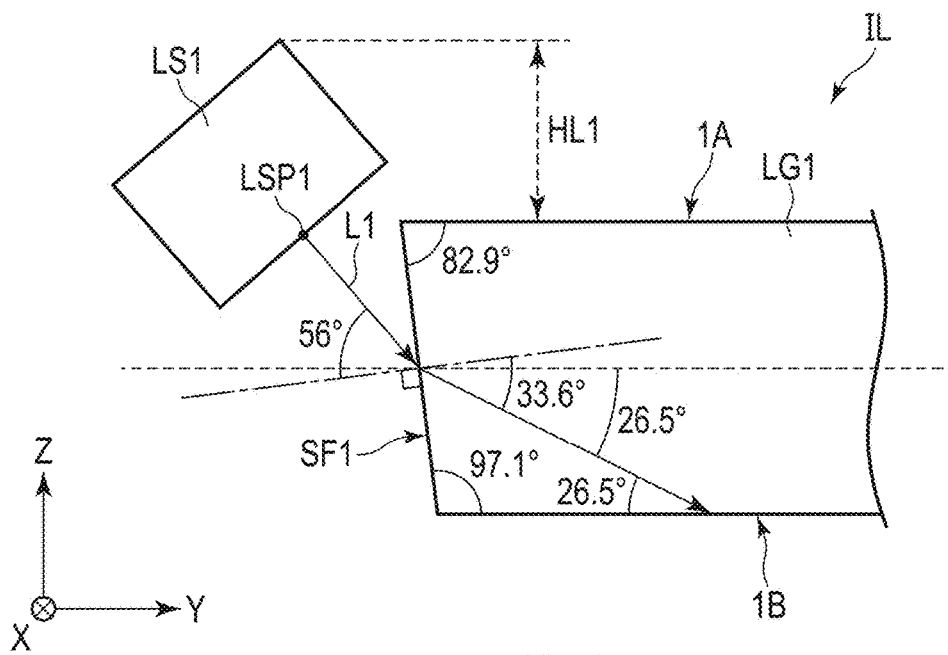
FIG. 12 is a cross-sectional view showing an example of the arrangement of the light source with respect to the light guide of the illumination device shown in FIG. 3.

FIG. 12 is a cross-sectional view showing an example of the arrangement of the light source LS1 relative to the light guide LG1 of the illumination device IL shown in FIG. 3. According to the inventors' study, when two inverted prism bottom angles of the prisms of the prism sheet PS are set at 61.3°, the refractive index n of the light guide is 1.5, the angle of total reflection condition of the incident light is 48°, and the radiation angle δ f the incident light is 6.5°, the emission efficiency of the illumination device IL can be improved to 90% by setting the angle between the incident light and the main and opposed surfaces of the light guide to 26.5°, setting bottom angles α1 of prisms PA and PB to 15° and, furthermore, setting apex angles of the prisms PA and PA to 130°.

In the example shown in FIG. 12, the light source LS1 emits P-polarized light L1 In the example shown in FIG. 12, the light source LS1 is arranged on the tip side of the arrow indicating the direction Z to the light guide LG1 such that the P-polarized light is made incident at an angle of incidence close to the Brewster's angle at which the reflectance to the side surface SF1 is less than or equal to 0.005 (hereinafter often referred to as a Brewster's approximate angle), for example, Brewster's approximate angle=56°, in the Y-Z plane. In other words, the light source LS1 is arranged on the tip side of the arrow indicating the direction Z to the light guide LG1 such that the P-polarized light is made incident on the main surface 1A side at an angle=56° to a straight line (normal) perpendicular to the side surface SF1 at which the reflectance to the side surface SF1 is less than or equal to 0.005 (0.5%), in the Y-Z plane. The light source LS1 may be arranged on the tip side of the arrow indicating the direction Z to the light guide LG1 such that the P-polarized light is made incident on the side surface SF1 at the Brewster's angle=55.9°, in the Y-Z plane. In other words, the light source LS1 may be arranged on the tip side of the arrow indicating the direction Z to the light guide LG1 such that the P-polarized light is made incident on the main surface 1A side at the angle=55.9° to the straight line perpendicular to the side surface SF1, in the Y-Z plane.

In the example shown in FIG. 12, the light source LS1 is arranged to be displaced (or shifted) from the main surface 1A to the tip side of the arrow indicating the direction Y. In other words, the light source LS1 is positioned more closely to the tip side of the arrow indicating the direction Y than to the main surface 1A. The light source LS1 is arranged at a position separated from the main surface 1A of the light guide LG1 toward the tip side of the arrow indicating the direction Z in a distance HL1. An emitting portion LSP1 of the light source LS1 that emits the P-polarized light L1 is positioned on an upper side of a center line which passes a center of the height of the main surface 1A and the opposed surface 1B of the light guide LG1 and which is parallel to the main surface 1A and the opposed surface 1B, in the direction Z.

In FIG. 12, the side surface SF1 is formed to be inclined to the main surface 1A at an angle=82.9° and inclined to the opposed surface 1B at an angle=97.1°, in the Y-Z plane. In other words, the side surface SF1 is formed to be inclined to the main surface 1A at an angle=82.9°, in the Y-Z plane. In addition, the side surface SF1 is formed to be inclined to the opposed surface 1B at an angle=97.1°, in the Y-Z plane.

In the example shown in FIG. 12, the light source LS1 emits the P-polarized light L1 from the main surface 1A side toward the side surface SF1 at the Brewster's approximate angle=56°, in the direction Z. The P-polarized light L1 emitted from the light source LS1 is made incident on the side surface SF1 at the Brewster's approximate angle=56° from the main surface 1A side in the direction Z. In other words, the P-polarized light L1 emitted from the light source LS1 is made incident of the side surface SF1 at an angle=56° to the straight line perpendicular to the side surface SF1 from the main surface 1A side in the direction Z. The P-polarized light L1 made incident on the light guide LG1 from air is refracted at the boundary between the air and the side surface SF1 at a refraction angle=33.6° to travel at an angle=26.5° with respect to the opposed side 1B. In other words, the P-polarized light L1 made incident on the light guide LG1 from the side surface SF1 is refracted at an angle of 33.6° to the opposed surface 1B side with respect to a straight line perpendicular to the side surface SF1, on the side surface SF1, to travel at 26.5° with respect to the opposed surface 1B.

Figure 13:
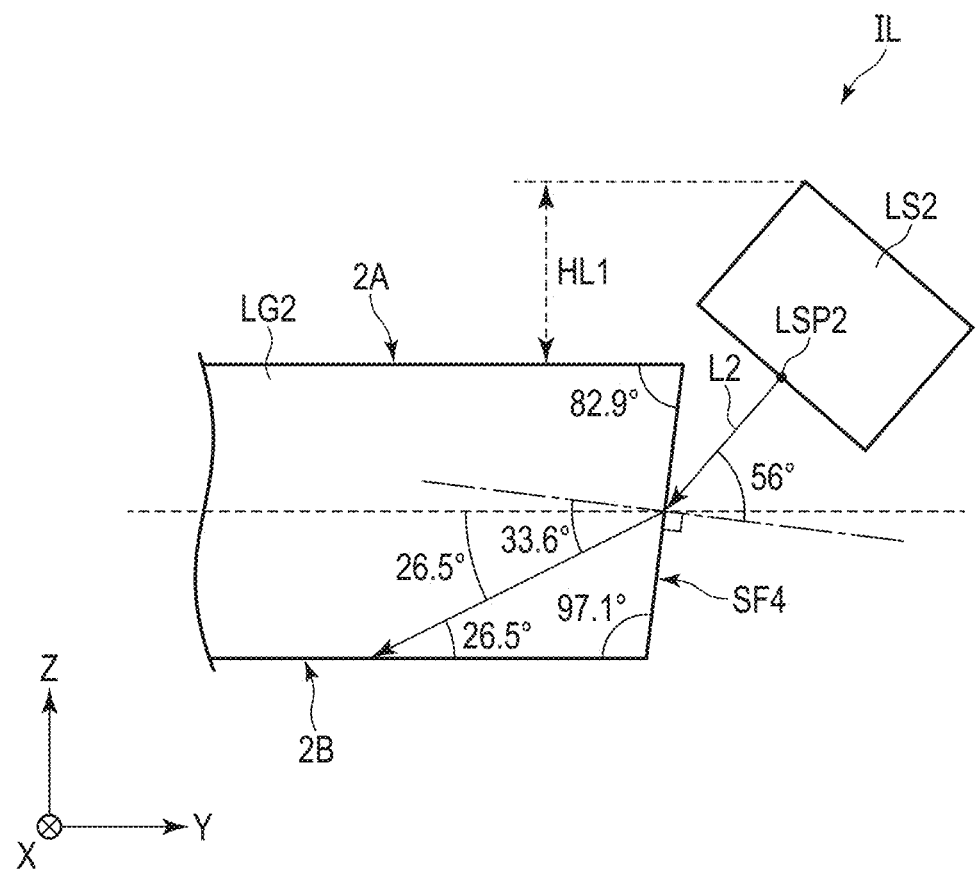
FIG. 13 is a cross-sectional view showing an example of the arrangement of the light source with respect to the light guide of the illumination device shown in FIG. 3.

FIG. 13 is a cross-sectional view showing an example of the arrangement of the light source LS2 relative to the light guide LG2 of the illumination device IL shown in FIG. 3.

In the example shown in FIG. 13, the light source LS2 emits the P-polarized light L2. In the example shown in FIG. 13, the light source LS2 is arranged on the tip side of the arrow indicating the direction Z to the light guide LG2 such that the P-polarized light is made incident at the Brewster's approximate angle at which the reflectance to the side surface SF4 is less than or equal to 0.005 (0.5%) to the side surface SF4, for example, at the Brewster's approximate angle=56°, in the Y-Z plane. In other words, the light source LS2 is arranged on the tip side of the arrow indicating the direction Z to the light guide LG2 such that the P-polarized light is made incident on the main surface 1A side at an angle=56° to a straight line perpendicular to the side surface SF4 at which the reflectance to the side surface SF4 is less than or equal to 0.005, in the Y-Z plane. The light source LS2 may be arranged on the tip side of the arrow indicating the direction Z to the light guide LG2 such that the P-polarized light is made incident on the side surface SF4 at the Brewster's angle=55.9°, in the Y-Z plane. In other words, the light source LS2 may be arranged on the tip side of the arrow indicating the direction Z to the light guide LG2 such that the P-polarized light is made incident on the main surface 1A side at the angle=55.9° to the straight line perpendicular to the side surface SF4, in the Y-Z plane.

In the example shown in FIG. 13, the light source LS2 is arranged to be displaced (or shifted) from the main surface 2A to a side opposite to the tip side of the arrow indicating the direction Y. In other words, the light source LS2 is positioned more closely to the tip side of the arrow indicating the direction Y than to the main surface 2A. The light source LS2 is arranged at a position separated from the main surface 2A of the light guide LG2 toward the tip side of the arrow indicating the direction Z in a distance HL1. An emitting portion LSP2 of the light source LS2 that emits the P-polarized light L2 is positioned on an upper side of a center line which passes a center of the height of the main surface 2A and the opposed surface 2B of the light guide LG2 and which is parallel to the main surface 2A and the opposed surface 2B, in the direction Z.

In FIG. 13, the side surface SF4 is formed to be inclined to the main surface 2A at an angle=82.9° and inclined to the opposed surface 2B at an angle=97.1°, in the Y-Z plane. In other words, the side surface SF4 is formed to be inclined to the main surface 2A at an angle=82.9°, in the Y-Z plane. In addition, the side surface SF4 is formed to be inclined to the opposed surface 2B at an angle=97.1°, in the Y-Z plane.

In the example shown in FIG. 13, the light source LS2 emits the P-polarized light L2 from the main surface 2A side toward the side surface SF4 at the Brewster's approximate angle=56°, in the direction Z. The P-polarized light L2 emitted from the light source LS2 is made incident on the side surface SF1 at the Brewster's approximate angle=56° from the main surface 2A side in the direction Z. In other words, the P-polarized light L2 emitted from the light source LS2 is made incident on the side surface SF4 at an angle=56° on the main surface 2A side to the straight line perpendicular to the side surface SF4, from the main surface 2A side in the direction Z. The P-polarized light L2 made incident on the light guide LG2 from air is refracted at the boundary between the air and the side surface SF4 at a refraction angle=33.6° to travel at an angle=26.5° with respect to the opposed surface 2B. In other words, the P-polarized light L2 made incident on the light guide LG2 from the side surface SF4 is refracted at an angle of 33.6° to the opposed surface 2B side with respect to a straight line perpendicular to the side surface SF4, on the side surface SF4, to travel at 26.5° with respect to the opposed surface 2B.

According to the embodiment, the illumination device IL comprises a light guide LG1, a light guide LG2, a plurality of light sources LS1, and a plurality of light sources LS2. The light guide LG1 has a main surface 1A opposed to the display panel PNL, an opposed surface 1B located on a side opposite to the main surface 1A in the direction Z, a side surface SF1, and a side surface SF2 located on a side opposite to the side surface SF1 in the direction Y. The side surface SF1 and the side surface SF2 are opposed to each other in the direction Y. The side surface SF1 is non-parallel to the X-Z plane. The side surface SF2 is parallel to the X-Z plane. The side surface SF1 and the side surface SF2 are provided non-parallel to each other. The side surface SF1 is a slope that extends from the inside to the outside of the direction Y according to the direction Z from the lower side to the upper side. The side surface SF1 is formed to be inclined at an angle=82.9° to the main surface 1A. The light guide LG2 has a main surface 2A opposed to the opposed surface 1B, an opposed surface 2B located on a side opposite to the main surface 2A in the direction Z, a side surface SF3 arranged with the side surface SF1 in the direction Z, and a side surface SF4 located on a side opposite to the side surface SF3 in the direction Y and arranged with the side surface SF2 in the direction Z. The side surface SF3 and the side surface SF4 are opposed to each other in the direction Y. The side surface SF3 is parallel to the X-Z plane. The side surface SF4 is non-parallel to the X-Z plane. The side surface SF3 and the side surface SF4 are provided non-parallel to each other. The side surface SF4 is a slope that extends from the inside to the outside of the direction Y according to the direction Z from the lower side to the upper side. The side surface SF4 is formed to be inclined at an angle=82.9° to the main surface 2A.

A plurality of light sources LS1 are opposed to the side surface SF1. The light sources LS1 emit the P-polarized light L1. The light source LS1 is arranged more closely to the tip side of the arrow indicating the direction Z than to the light guide LG1 such that the P-polarized light is made incident at the Brewster's approximate angle=56° at which the reflectance to the side surface SF1 is less than or equal to 0.005. A plurality of light sources LS2 are opposed to the side surface SF4. The light sources LS2 emit the P-polarized light L2. The light source LS2 is arranged more closely to the tip side of the arrow indicating the direction Z than to the light guide LG2 such that the P-polarized light is made incident at the Brewster's approximate angle=56° at which the reflectance to the side surface SF4 is less than or equal to 0.005. Therefore, the illumination device IL can improve the efficiency of emission of the light emitted from the light sources LS1 and LS2, from the light guides LG1 and LG2. For this reason, the display device DSP can also improve the emission efficiency.

Next, the display device DSP and the illumination device IL of modified examples of the first embodiment, and other embodiments will be described. In the modified examples and other embodiments to be described below, the same portions as those of the display device DSP and the illumination device IL of the first embodiment described above will be denoted by the same reference numerals, and their detailed descriptions will be omitted or simplified, and portions different from those of the display device DSP and the illumination device IL of the first embodiment will be mainly described in detail. The same effects as those of the above-described embodiment can also be obtained in the modified examples and other embodiments.

MODIFIED EXAMPLE 1

The illumination device IL according to modified example 1 of the first embodiment is different from the illumination device IL of the first embodiment in configuration of the light sources LS1 and LSF2.

Figure 14:
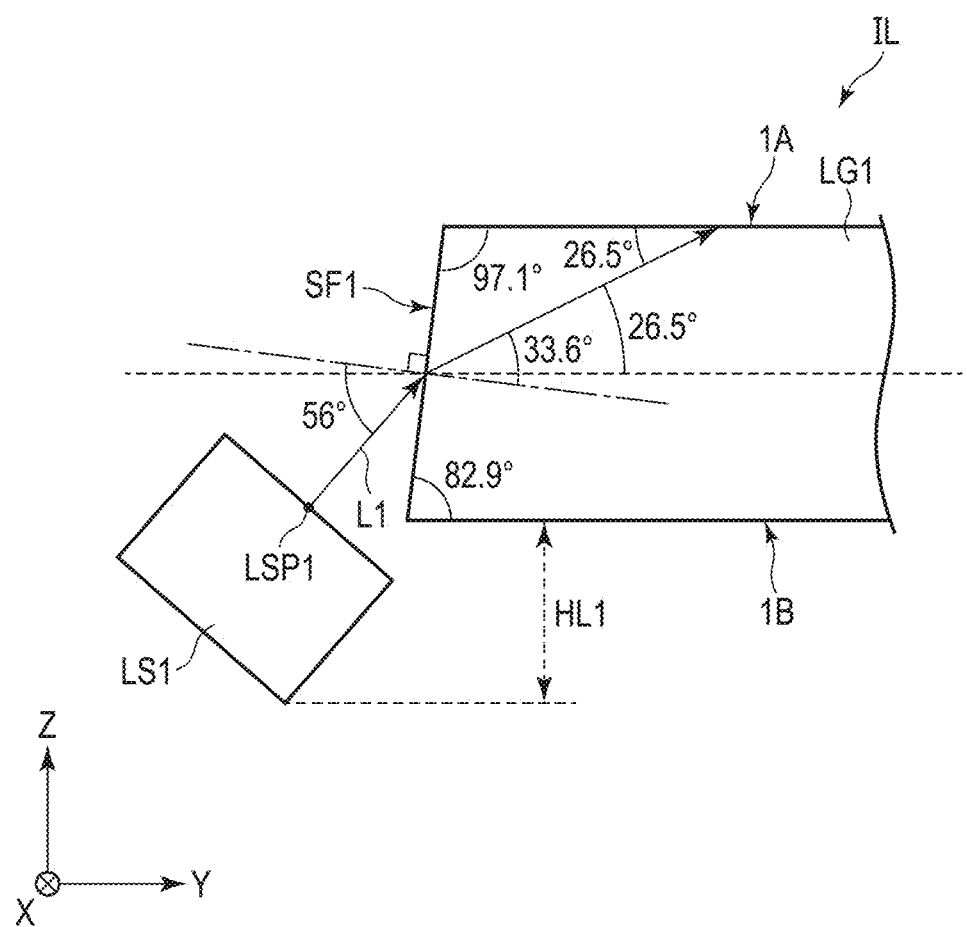
FIG. 14 is a cross-sectional view showing an example of the arrangement of the light source with respect to the light guide of the illumination device according to modified example 1.

FIG. 14 is a cross-sectional view showing an example of the arrangement of the light source LS1 relative to the light guide LG1 of the illumination device IL according to modified example 1.

In the example shown in FIG. 14, the light source LS1 is arranged on a side opposite to the tip side of the arrow indicating the direction Z to the light guide LG1 such that the P-polarized light is made incident at the Brewster's approximate angle=56° at which the reflectance to the side surface SF1 is less than or equal to 0.005 (0.5%), in the Y-Z plane. In other words, the light source LS1 is arranged on a side opposite to the tip side of the arrow indicating the direction Z to the light guide LG1 such that the P-polarized light is made incident on the opposed surface 1B side at an angle=56° to a straight line perpendicular to the side surface SF1 at which the reflectance to the side surface SF1 is less than or equal to 0.005, in the Y-Z plane. The light source LS1 may be arranged on a side opposite to the tip side of the arrow indicating the direction Z to the light guide LG1 such that the P-polarized light is made incident on the side surface SF1 at the Brewster's angle=55.9°, in the Y-Z plane. In other words, the light source LS1 may be arranged on a side opposite to the tip side of the arrow indicating the direction Z to the light guide LG1 such that the P-polarized light is made incident on the opposed surface 1B side at the angle=55.9° to the straight line perpendicular to the side surface SF1, in the Y-Z plane.

In the example shown in FIG. 14, the light source LS1 is arranged to be displaced (or shifted) from the opposed surface 1B to a side opposite to the tip side of the arrow indicating the direction Y. In other words, the light source LS1 is positioned more closely to the side opposite to the tip side of the arrow indicating the direction Y than to the opposed surface 1B. The light source LS1 is arranged at a position separated from the opposed surface 1B of the light guide LG1 toward the side opposite to the tip side of the arrow indicating the direction Z in a distance HL1. The emitting portion LSP1 of the light source LS1 that emits the P-polarized light L1 is positioned on a lower side of a center line which passes a center of the height of the main surface 1A and the opposed surface 1B of the light guide LG1 and which is parallel to the main surface 1A and the opposed surface 1B, in the direction Z.

In FIG. 14, the side surface SF1 is formed to be inclined to the main surface 1A at an angle=97.1° and inclined to the opposed surface 1B at an angle=82.9°, in the Y-Z plane. In other words, the side surface SF1 is formed to be inclined at an angle=82.9° to the opposed surface 1B, in the Y-Z plane. In other words, the side surface SF1 is formed to be inclined to the main surface 1A at an angle=97.1°, in the Y-Z plane.

In the example shown in FIG. 14, the light source LS1 emits the P-polarized light L1 from the opposed surface 1B side toward the side surface SF1 at the Brewster's approximate angle=56°, in the direction Z. The P-polarized light L1 emitted from the light source LS1 is made incident on the side surface SF1 at the Brewster's approximate angle=56° from the opposed surface 1B side in the direction Z. The P-polarized light L1 made incident on the light guide LG1 from air is refracted at the boundary between the air and the side surface SF1 at a refraction angle=33.6° to travel at an angle=26.5° with respect to the main surface 1A. In other words, the P-polarized light L1 made incident on the light guide LG1 from the side surface SF1 is refracted at an angle=33.6° to the main surface 1A side with respect to a straight line perpendicular to the side surface SF1, on the side surface SF1, to travels at 26.5° to the main surface 1A.

Figure 15:
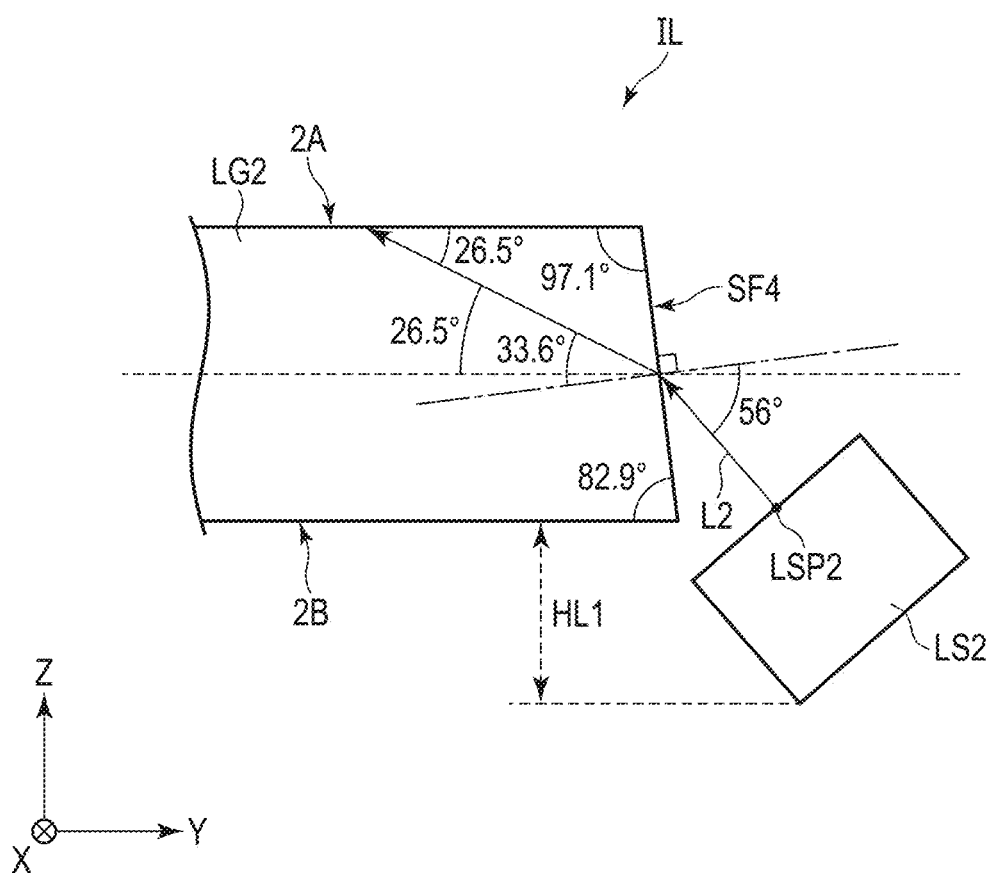
FIG. 15 is a cross-sectional view showing an example of the arrangement of the light source with respect to the light guide of the illumination device according to modified example 1.

FIG. 15 is a cross-sectional view showing an example of the arrangement of the light source LS2 relative to the light guide LG2 of the illumination device IL according to modified example 1.

In the example shown in FIG. 15, the light source LS2 is arranged on a side opposite to the tip side of the arrow indicating the direction Z to the light guide LG2 such that the P-polarized light is made incident at the Brewster's approximate angle=56° at which the reflectance to the side surface SF4 is less than or equal to 0.005 (0.5%), in the Y-Z plane. In other words, the light source LS2 is arranged on a side opposite to the tip side of the arrow indicating the direction Z to the light guide LG2 such that the P-polarized light is made incident on the opposed surface 1B side at an angle=56° to a straight line perpendicular to the side surface SF4 at which the reflectance to the side surface SF4 is less than or equal to 0.005 (0.5%), in the Y-Z plane. The light source LS2 may be arranged on a side opposite to the tip side of the arrow indicating the direction Z to the light guide LG2 such that the P-polarized light is made incident on the side surface SF4 at the Brewster's angle=55.9°, in the Y-Z plane. In other words, the light source LS2 may be arranged on a side opposite to the tip side of the arrow indicating the direction Z to the light guide LG2 such that the P-polarized light is made incident on the opposed surface 1B side at the angle=55.9° to the straight line perpendicular to the side surface SF4, in the Y-Z plane.

In the example shown in FIG. 15, the light source LS2 is arranged to be displaced (or shifted) from the opposed surface 2B to a side opposite to the tip side of the arrow indicating the direction Y. In other words, the light source LS2 is positioned more closely to the side opposite to the tip side of the arrow indicating the direction Y than to the opposed surface 2B. The light source LS2 is arranged at a position separated from the opposed surface 2B of the light guide LG2 toward the side opposite to the tip side of the arrow indicating the direction Z in a distance HL1. The emitting portion LSP2 of the light source LS2 that emits the P-polarized light L2 is positioned on a lower side of a center line which passes a center of the height of the main surface 2A and the opposed surface 2B of the light guide LG2 and which is parallel to the main surface 2A and the opposed surface 2B, in the direction Z.

In FIG. 15, the side surface SF4 is formed to be inclined at an angle=82.9° to the opposed surface 2B and at an angle=97.1° to the main surface 2A, in the Y-Z plane. In other words, the side surface SF4 is formed to be inclined at an angle=82.9° to the opposed surface 2B, in the Y-Z plane. In other words, the side surface SF4 is formed to be inclined to the main surface 2A at an angle=97.1°, in the Y-Z plane.

In the example shown in FIG. 15, the light source LS2 emits the P-polarized light L2 from the opposed surface 2B side toward the side surface SF4 at the Brewster's approximate angle=56°, in the direction Z. The P-polarized light L2 emitted from the light source LS2 is made incident on the side surface SF4 at the Brewster's approximate angle=56° from the opposed surface 2B side in the direction Z. The P-polarized light L2 made incident on the light guide LG2 from air is refracted at the boundary between the air and the side surface SF4 at a refraction angle=33.6° to travel at an angle=26.5° with respect to the main surface 2A. In other words, the P-polarized light L2 made incident on the light guide LG2 from the side surface SF4 is refracted at an angle=33.6° to the main surface 2A side with respect to a straight line perpendicular to the side surface SF4, on the side surface SF4, to travel at 26.5° with respect to the main surface 2A.

In such modified example 1, too, the same advantages as those of the first embodiment can be obtained.

Second Embodiment

A display device DSP according to the second embodiment is different from the display device DSP of the first embodiment in configuration of light sources LS1 and LS2 of an illumination device IL and the light guides LG1 and LG2 of the illumination device IL.

Figure 16:
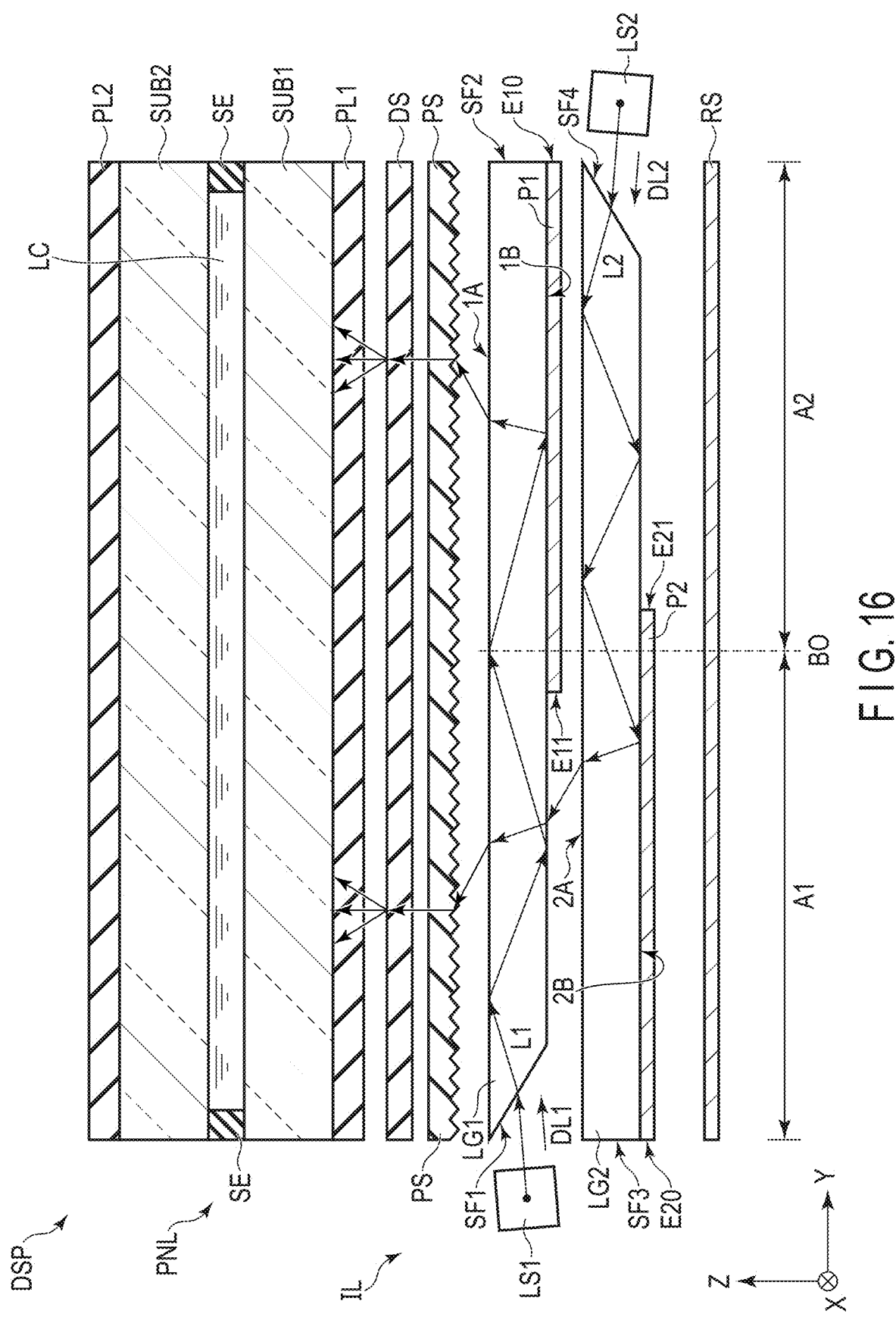
FIG. 16 is a cross-sectional view showing a display device according to a second embodiment.

FIG. 16 is a cross-sectional view showing the display device DSP according to the second embodiment.

For example, a side surface SF1 is inclined at an angle larger than 0° with respect to a main surface 1A and at an angle smaller than 90°—Brewster's angle. In addition, for example, a side surface SF4 is inclined at an angle larger than 0° with respect to a main surface 2A and at an angle smaller than 90°—Brewster's angle.

Light L1 emitted from the light source LS1 is not reflected at all or almost at an interface between the side surface SF1 and an air layer, but is made incident on the light guide LG1 from the side surface SF1 and is refracted on the side surface SF1. Light traveling toward the main surface 1A, of the light L1 made incident on the light guide LG1 is reflected (for example, total reflection) at the interface between the light guide LG1 and the air layer. In addition, light traveling toward an opposed surface 1B, of the light L1 made incident on the light guide LG1 is reflected (for example, total reflection) at the interface between the light guide LG1 and the air layer. Thus, in the area where the reflective layer P1 is not provided, of the first area A1, the light L1 travels toward the tip side of the arrow indicating the direction Y, inside the light guide LG1, while repeatedly reflected on the main surface 1A and the opposed surface 1B (for example, total reflection).

Similarly, light L2 emitted from the light source LS2 is not reflected at all or almost at the interface between the side surface SF4 and the air layer, but is made incident on the light guide LG2 from the side surface SF4 and is refracted on the side surface SF4. The light traveling toward the main surface 2A, of the light L2 made incident on the light guide LG2 is reflected (for example, total reflection) at the interface between the light guide LG2 and the air layer. In addition, light traveling toward an opposed surface 2B, of the light L2 made incident on the light guide LG2 is reflected (for example, total reflection) at the interface between the light guide LG2 and the air layer. Thus, in the area where the reflective layer P2 is not provided, of the second area A2, the light L2 travels toward the side opposite to the tip side of the arrow indicating the direction Y, inside the light guide LG2, while repeatedly reflected on the main surface 2A and the opposed surface 2B (for example, total reflection).

Figure 17:
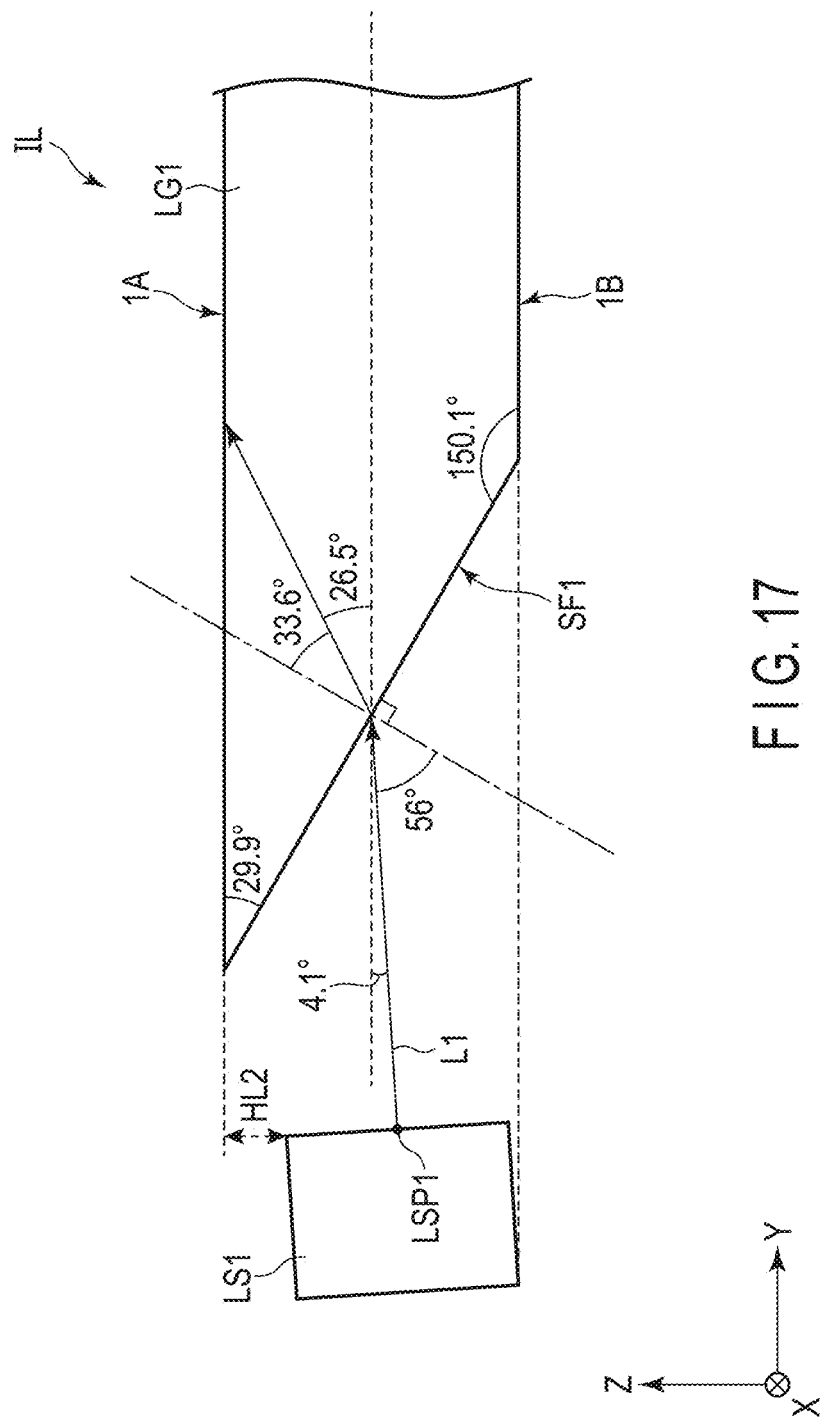
FIG. 17 is a cross-sectional view showing an example of the arrangement of the light source with respect to the light guide of the illumination device according to the second embodiment.

FIG. 17 is a cross-sectional view showing an example of the arrangement of the light source LS1 relative to the light guide LG1 of the illumination device IL according to the second embodiment.

In the example shown in FIG. 17, the light source LS1 is arranged at a position separated on a side opposite to the tip side of the arrow indicating the direction Y to the side surface SF1 such that the P-polarized light is made incident at the Brewster's approximate angle at which the reflectance to the side surface SF1 is less than or equal to 0.005 (0.5%) to the side surface SF1, for example, at the Brewster's approximate angle=56°, in the Y-Z plane. In other words, the light source LS1 is arranged at a position separated on a side opposite to the tip side of the arrow indicating the direction Y to the side surface SF1 such that the P-polarized light is made incident on the main surface 1A side at an angle=56° to a straight line perpendicular to the side surface SF1 at which the reflectance to the side surface SF1 is less than or equal to 0.005, in the Y-Z plane. In other words, the light source LS1 is arranged at a position separated on the side opposite to the tip side of the arrow indicating the direction Y to the side surface SF1 such that the P-polarized light is made incident at an angle=4.1° to a center line which passes the center of the light guide LG1 and which is parallel to the main surface 1A and the opposed surface 1B, in the Y-Z plane.

The light source LS1 may be arranged at a position separated on the side opposite to the tip side of the arrow indicating the direction Y to the side surface SF1 such that the P-polarized light is made incident on the side surface SF1 at the Brewster's angle=55.9°, in the Y-Z plane. In other words, the light source LS1 may be arranged at a position separated on a side opposed to the tip side of the arrow indicating the direction Y to the side surface SF1 such that the P-polarized light is made incident on the main surface 1A side at the angle=55.9° to the straight line perpendicular to the side surface SF1, in the Y-Z plane.

In the example shown in FIG. 17, the light source LS1 is arranged between the main surface 1A and the opposed surface 1B in the direction Z. In other words, the light source LS1 is arranged between heights of the main surface 1A and the opposed surface 1B, in the direction Z. The light source LS1 is arranged within a range from the main surface 1A to a position separated from a side opposite to the tip side of the arrow indicating the direction Z in a distance HL2. The light source LS1 is arranged to be inclined on a lower side at an angle of 4.1° to a center line which passes a center of the height of the main surface 1A and the opposed surface 1B of the light guide LG1 and which is parallel to the main surface 1A and the opposed surface 1B, in the direction Z. The emitting portion LSP1 of the light source LS1 that emits the P-polarized light L1 is positioned on a lower side of a center line which passes a center of the height of the main surface 1A and the opposed surface 1B of the light guide LG1 and which is parallel to the main surface 1A and the opposed surface 1B, in the direction Z.

In FIG. 17, the side surface SF1 is formed to be inclined at an angle=29.9° to the main surface 1A and at an angle=150.1° to the opposed surface 1B, in the Y-Z plane. In other words, the side surface SF1 is formed to be inclined to the main surface 1A at an angle=29.9°, in the Y-Z plane. In addition, the side surface SF1 is formed to be inclined to the opposed surface 1B at an angle=150.1°, in the Y-Z plane.

In the example shown in FIG. 17, the light source LS1 emits the P-polarized light L1 from the opposed surface 1B side toward the side surface SF1 at the Brewster's approximate angle=56°, in the direction Z. The P-polarized light L1 emitted from the light source LS1 is made incident on the side surface SF1 at the Brewster's approximate angle=56° from the opposed surface 1B side in the direction Z. In other words, the P-polarized light L1 emitted from the light source LS1 is made incident on the side surface SF1 at an angle=56° on the main surface 1A side to the straight line perpendicular to the side surface SF1, in the direction Z. The P-polarized light L1 made incident on the light guide LG1 from air is refracted at the boundary between the air and the side surface SF1 at a refraction angle=33.6° to travel at an angle=26.5° with respect to the main surface 1A. In other words, the P-polarized light L1 made incident on the light guide LG1 from the side surface SF1 is refracted at an angle of 33.6° to the opposed surface 1B side with respect to a straight line perpendicular to the side surface SF1, on the side surface SF1, to travel at 26.5° with respect to the main surface 1A.

Figure 18:
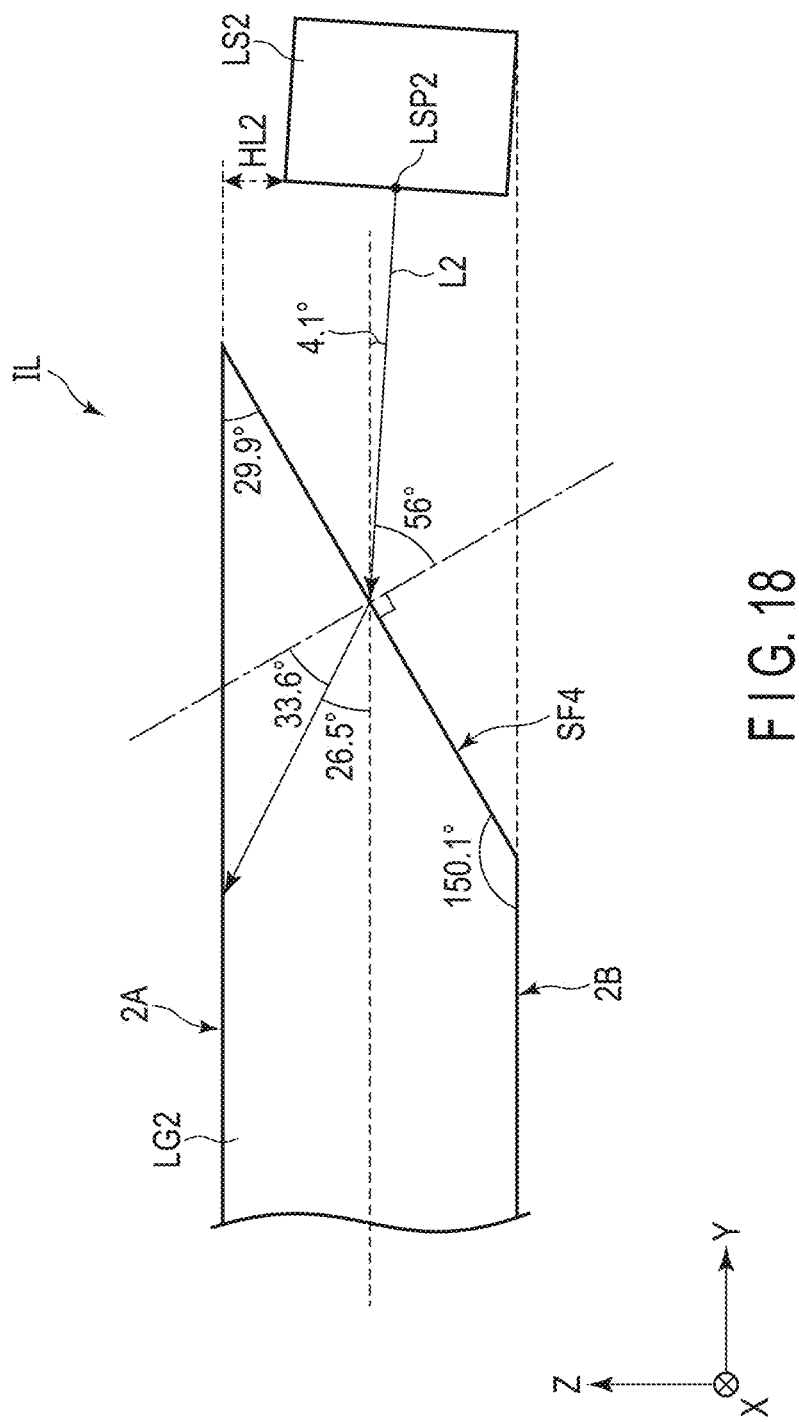
FIG. 18 is a cross-sectional view showing an example of the arrangement of the light source with respect to the light guide of the illumination device according to the second embodiment.

FIG. 18 is a cross-sectional view showing an example of the arrangement of the light source LS2 relative to the light guide LG2 of the illumination device IL according to the second embodiment.

In the example shown in FIG. 18, the light source LS2 emits the P-polarized light L2. In the example shown in FIG. 18, the light source LS2 is arranged at a position separated on a side opposite to the tip side of the arrow indicating the direction Y to the side surface SF4 such that the P-polarized light is made incident at the Brewster's approximate angle at which the reflectance to the side surface SF4 is less than or equal to 0.005 (0.5%) to the side surface SF1, for example, at the Brewster's approximate angle=56°, in the Y-Z plane. In other words, the light source LS2 is arranged at a position separated on the tip side of the arrow indicating the direction Y to the side surface SF4 such that the P-polarized light is made incident on the main surface 2A side at an angle=56° to a straight line perpendicular to the side surface SF4 at which the reflectance to the side surface SF4 is less than or equal to 0.005, in the Y-Z plane. In other words, the light source LS2 is arranged at a position separated on the tip side of the arrow indicating the direction Y to the side surface SF1 such that the P-polarized light is made incident at an angle=4.1° to a center line which passes the center of the light guide LG2 and which is parallel to the main surface 2A and the opposed surface 2B, in the Y-Z plane.

The light source LS2 may be arranged at a position separated on the tip side of the arrow indicating the direction Y to the side surface SF4 such that the P-polarized light is made incident on the side surface SF4 at the Brewster's angle=55.9°, in the Y-Z plane. In other words, the light source LS2 may be arranged at a position separated on the tip side of the arrow indicating the direction Y to the side surface SF4 such that the P-polarized light is made incident on the opposed surface 2B side at the angle=55.9° to the straight line perpendicular to the side surface SF4, in the Y-Z plane.

In the example shown in FIG. 18, the light source LS2 is arranged between the main surface 2A and the opposed surface 2B in the direction Z. In other words, the light source LS2 is arranged between heights of the main surface 2A and the opposed surface 2B in the direction Z. The light source LS2 is arranged within a range from the main surface 2A to a position separated from a side opposite to the tip side of the arrow indicating the direction Z in the distance HL2. The light source LS2 is arranged to be inclined on a lower side at an angle of 4.1° to a center line which passes a center of the height of the main surface 2A and the opposed surface 2B of the light guide LG2 and which is parallel to the main surface 2A and the opposed surface 2B, in the direction Z. The emitting portion LSP2 of the light source LS2 that emits the P-polarized light L1 is positioned on a lower side of a center line which passes a center of the height of the main surface 2A and the opposed surface 2B of the light guide LG2 and which is parallel to the main surface 2A and the opposed surface 2B, in the direction Z.

In FIG. 18, the side surface SF4 is formed to be inclined to the main surface 2A at an angle=29.9° and inclined to the opposed surface 2B at an angle=150.1°, in the Y-Z plane. In other words, the side surface SF4 is formed to be inclined to the main surface 2A at an angle=29.9°, in the Y-Z plane. In addition, the side surface SF4 is formed to be inclined to the opposed surface 2B at an angle=150.1°, in the Y-Z plane.

In the example shown in FIG. 18, the light source LS2 emits the P-polarized light L2 from the opposed surface 2B side toward the side surface SF4 at the Brewster's approximate angle=56°, in the direction Z. The P-polarized light L2 emitted from the light source LS2 is made incident on the side surface SF4 at the Brewster's approximate angle=56° from the opposed surface 2B side in the direction Z. In other words, the P-polarized light L2 emitted from the light source LS2 is made incident on the side surface SF4 at an angle=56° on the main surface 2A side to the straight line perpendicular to the side surface SF4, from the opposed surface 2B side in the direction Z. The P-polarized light L2 made incident on the light guide LG2 from air is refracted at the boundary between the air and the side surface SF4 at a refraction angle=33.6° to travel at an angle=26.5° with respect to the main surface 2A. In other words, the P-polarized light L2 made incident on the light guide LG2 from the side surface SF4 is refracted at an angle of 33.6° to the opposed surface 2B side with respect to a straight line perpendicular to the side surface SF4, on the side surface SF4, to travel at 26.5° with respect to the main surface 2A.

The second embodiment also has the same advantages as those of the first embodiment and modified example 1. In addition, the thickness of the illumination device IL of the second embodiment can be made smaller than the thickness of the illumination device IL of the first embodiment.

MODIFIED EXAMPLE 2

The illumination device IL according to modified example 2 of the second embodiment is different from the illumination device IL of the first embodiment, modified example 1, and the second embodiment in configuration of the light sources LS1 and LSF2.

Figure 19:
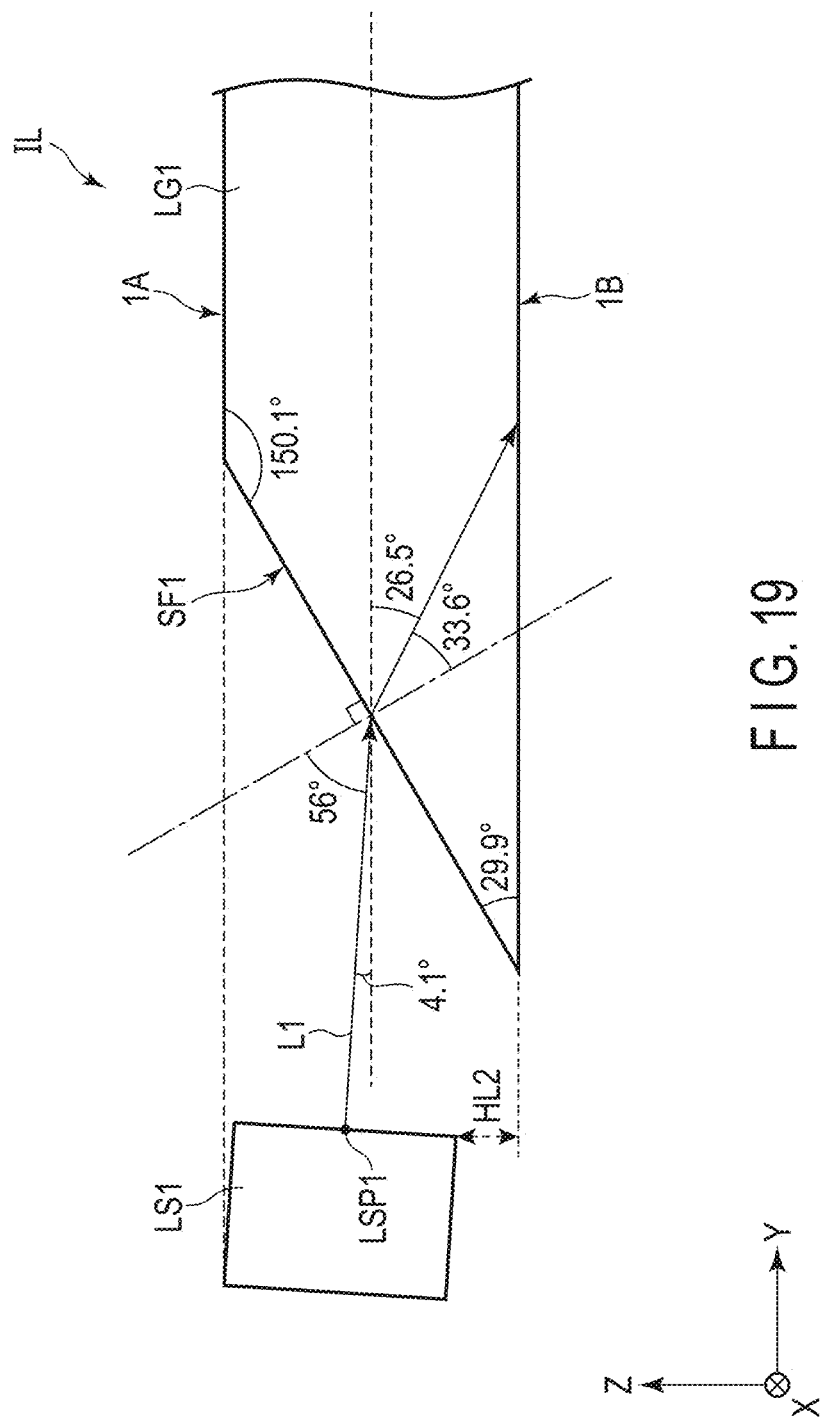
FIG. 19 is a cross-sectional view showing an example of the arrangement of the light source with respect to the light guide of the illumination device according to modified example 2.

FIG. 19 is a cross-sectional view showing an example of the arrangement of the light source LS1 relative to the light guide LG1 of the illumination device IL according to modified example 2.

In the example shown in FIG. 19, the light source LS1 is arranged at a position separated on a side opposite to the tip side of the arrow indicating the direction Y to the side surface SF1 such that the P-polarized light is made incident at the Brewster's approximate angle at which the reflectance to the side surface SF1 is less than or equal to 0.005 (0.5%) to the side surface SF1, for example, at the Brewster's approximate angle=56°, in the Y-Z plane. In other words, the light source LS1 is arranged at a position separated on a side opposite to the tip side of the arrow indicating the direction Y to the side surface SF1 such that the P-polarized light is made incident on the opposed surface 1B side at an angle=56° to a straight line perpendicular to the side surface SF1 at which the reflectance to the side surface SF1 is less than or equal to 0.005, in the Y-Z plane. In other words, the light source LS1 is arranged at a position separated on the side opposite to the tip side of the arrow indicating the direction Y to the side surface SF1 such that the P-polarized light is made incident at an angle=4.1° to a center line which passes the center of the light guide LG1 and which is parallel to the main surface 1A and the opposed surface 1B, in the Y-Z plane.

The light source LS1 may be arranged at a position separated on the side opposite to the tip side of the arrow indicating the direction Y to the side surface SF1 such that the P-polarized light is made incident on the side surface SF1 at the Brewster's angle=55.9°, in the Y-Z plane. In other words, the light source LS1 may be arranged at a position separated on the side opposite to the tip side of the arrow indicating the direction Y to the side surface SF1 such that the P-polarized light is made incident on the opposed surface 1B side at the angle=55.9° to the straight line perpendicular to the side surface SF1, in the Y-Z plane.

In the example shown in FIG. 19, the light source LS1 is arranged between the main surface 1A and the opposed surface 1B of the light guide LG1, in the direction Z. In other words, the light source LS1 is arranged between heights of the main surface 1A and the opposed surface 1B, in the direction Z. The light source LS1 is arranged within a range from a position separated from the opposed surface 1B on the tip side of the arrow indicating the direction Z in a distance HL2, to the main surface 1A. The light source LS1 is arranged to be inclined on an upper side at an angle of 4.1° to a center line which passes a center of the height of the main surface 1A and the opposed surface 1B of the light guide LG1 and which is parallel to the main surface 1A and the opposed surface 1B, in the direction Z. An emitting portion LSP1 of the light source LS1 that emits the P-polarized light L1 is positioned on an upper side of a center line which passes a center of the height of the main surface 1A and the opposed surface 1B of the light guide LG1 and which is parallel to the main surface 1A and the opposed surface 1B, in the direction Z.

In FIG. 19, the side surface SF1 is formed to be inclined to the main surface 1A at an angle=150.1° and inclined to the opposed surface 1B at an angle=29.9°, in the Y-Z plane. In other words, the side surface SF1 is formed to be inclined to the main surface 1A at an angle=150.1°, in the Y-Z plane. In addition, the side surface SF1 is formed to be inclined to the opposed surface 1B at an angle=29.9°, in the Y-Z plane.

In the example shown in FIG. 19, the light source LS1 emits the P-polarized light L1 from the main surface 1A side toward the side surface SF1 at the Brewster's approximate angle=56°, in the direction Z. The P-polarized light L1 emitted from the light source LS1 is made incident on the side surface SF1 at the Brewster's approximate angle=56° from the main surface 1A side in the direction Z. In other words, the P-polarized light L1 emitted from the light source LS1 is made incident on the side surface SF1 at an angle=56° on the opposed surface 1B side to the straight line perpendicular to the side surface SF1, from the main surface 1A side in the direction Z. The P-polarized light L1 made incident on the light guide LG1 from air is refracted at the boundary between the air and the side surface SF1 at a refraction angle=33.6° to travel at an angle=26.5° with respect to the opposed side 1B. In other words, the P-polarized light L1 made incident on the light guide LG1 from the side surface SF1 is refracted at an angle of 33.6° to the main surface 2A side with respect to a straight line perpendicular to the side surface SF1, on the side surface SF1, to travel at 26.5° with respect to the opposed surface 1B.

Figure 20:
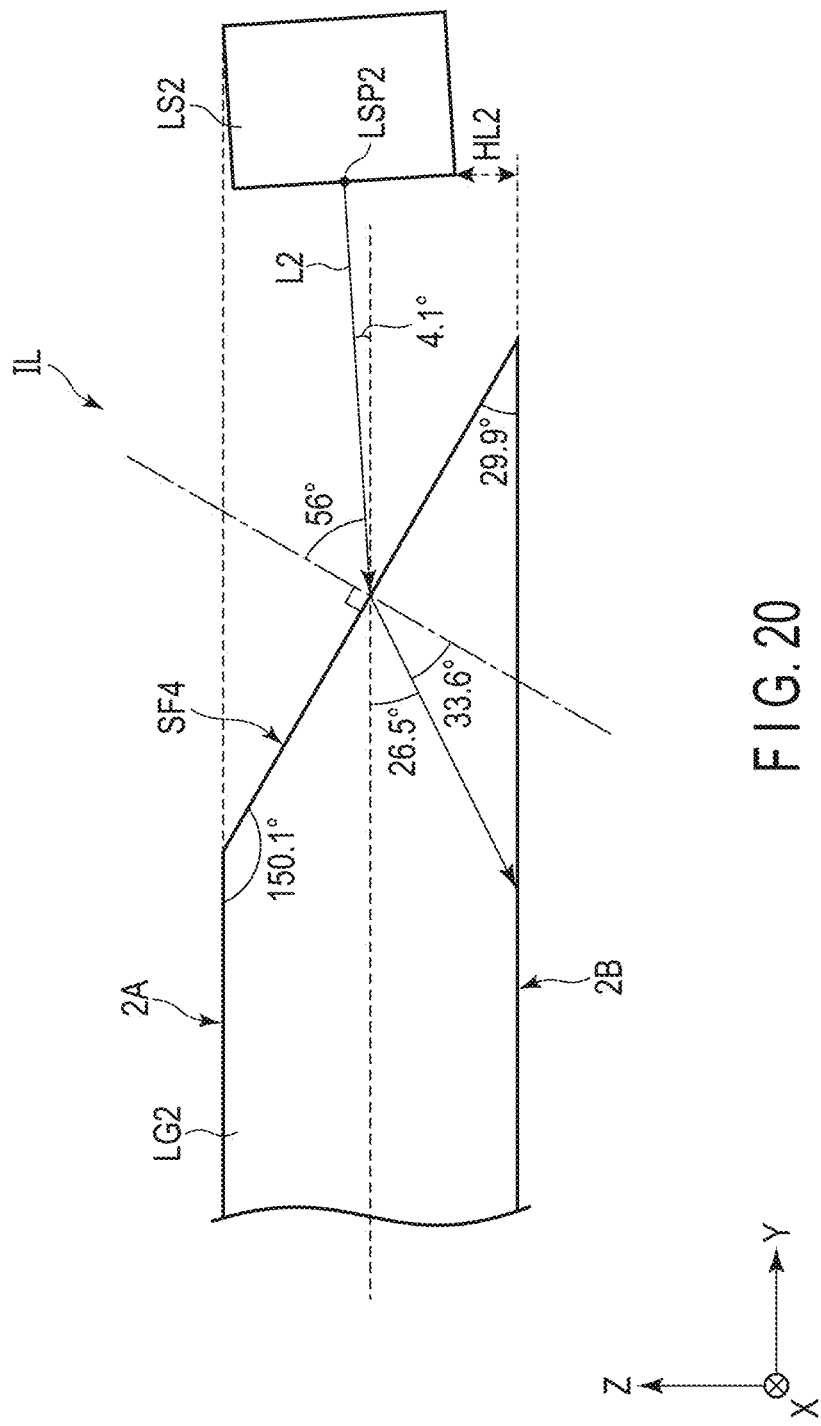
FIG. 20 is a cross-sectional view showing an example of the arrangement of the light source with respect to the light guide of the illumination device according to modified example 2.

FIG. 20 is a cross-sectional view showing an example of the arrangement of the light source LS2 relative to the light guide LG2 of the illumination device IL according to modified example 2.

In the example shown in FIG. 20, the light source LS2 is arranged at a position separated on the tip side of the arrow indicating the direction Y to the side surface SF4 such that the P-polarized light is made incident at the Brewster's approximate angle at which the reflectance to the side surface SF4 is less than or equal to 0.005 (0.5%) to the side surface SF1, for example, at the Brewster's approximate angle=56°, in the Y-Z plane. In other words, the light source LS2 is arranged at a position separated on the tip side of the arrow indicating the direction Y to the side surface SF4 such that the P-polarized light is made incident on the opposed surface 2B side at an angle=56° to a straight line perpendicular to the side surface SF4 at which the reflectance to the side surface SF4 is less than or equal to 0.005, in the Y-Z plane. In other words, the light source LS2 is arranged at a position separated on the tip side of the arrow indicating the direction Y to the side surface SF4 such that the P-polarized light is made incident at an angle=4.1° to a straight line which passes the center of the light guide LG2 and which is parallel to the main surface 2A and the opposed surface 2B, in the Y-Z plane.

The light source LS2 may be arranged at a position separated on the tip side of the arrow indicating the direction Y to the side surface SF4 such that the P-polarized light is made incident on the side surface SF4 at the Brewster's angle=55.9°, in the Y-Z plane. In other words, the light source LS2 may be arranged at a position separated on the tip side of the arrow indicating the direction Y to the side surface SF4 such that the P-polarized light is made incident on the opposed surface 2B side at the angle=55.9° to the straight line perpendicular to the side surface SF4, in the Y-Z plane.

In the example shown in FIG. 20, the light source LS2 is arranged between the main surface 2A and the opposed surface 2B in the direction Z. In other words, the light source LS2 is arranged between heights of the main surface 2A and the opposed surface 2B in the direction Z. The light source LS2 is arranged within a range from a position separated from the opposed surface 2B on the tip side of the arrow indicating the direction Z in a distance HL2, to the main surface 2A. The light source LS2 is arranged to be inclined on an upper side at an angle of 4.1° to a center line which passes a center of the height of the main surface 2A and the opposed surface 2B of the light guide LG2 and which is parallel to the main surface 2A and the opposed surface 2B, in the direction Z. An emitting portion LSP2 of the light source LS2 that emits the P-polarized light L1 is positioned on an upper side of a center line which passes a center of the height of the main surface 2A and the opposed surface 2B of the light guide LG2 and which is parallel to the main surface 2A and the opposed surface 2B, in the direction Z.

In FIG. 20, the side surface SF4 is formed to be inclined to the main surface 2A at an angle=150.1° and inclined to the opposed surface 2B at an angle=29.9°, in the Y-Z plane. In other words, the side surface SF4 is formed to be inclined to the main surface 2A at an angle=29.9°, in the Y-Z plane. In addition, the side surface SF4 is formed to be inclined to the opposed surface 2B at an angle=150.1°, in the Y-Z plane.

In the example shown in FIG. 20, the light source LS2 emits the P-polarized light L2 from the main surface 2A side toward the side surface SF4 at the Brewster's approximate angle=56°, in the direction Z. The P-polarized light L2 emitted from the light source LS2 is made incident on the side surface SF4 at the Brewster's approximate angle=56° from the main surface 2A side in the direction Z. In other words, the P-polarized light L2 emitted from the light source LS2 is made incident on the side surface SF4 at an angle=56° on the opposed surface 2B side to the straight line perpendicular to the side surface SF4, from the opposed surface 2B side in the direction Z. The P-polarized light L2 made incident on the light guide LG2 from air is refracted at the boundary between the air and the side surface SF4 at a refraction angle=33.6° to travel at an angle=26.5° with respect to the opposed surface 2B. In other words, the P-polarized light L2 made incident on the light guide LG2 from the side surface SF4 is refracted at an angle of 33.6° to the main surface 2A side with respect to a straight line perpendicular to the side surface SF4, on the side surface SF4, to travel at 26.5° with respect to the opposed surface 2B.

The second embodiment also has the same advantages as those of the first embodiment and modified example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An illumination device comprising:
a first light guide having a first side surface, a second side surface located on a side opposite to the first side surface in a first direction, a first main surface, and a first opposed surface located on a side opposite to the first main surface in a second direction intersecting the first direction;
a first light source opposed to the first side surface to emit first P-polarized light to the first side surface;
a second light guide having a third side surface, a fourth side surface located on a side opposite to the third side surface in a first direction, a second main surface, and a second opposed surface located on a side opposite to the second main surface in the second direction; and
a second light source opposed to the third side surface to emit second P-polarized light to the third side surface,
the first side surface being inclined to the first main surface and the first opposed surface,
the first light source being inclined to a first straight line perpendicular to the first side surface,
the third side surface being arranged with the first side surface in the second direction,
the fourth side surface being arranged with the second side surface in the second direction and inclined to the second main surface and the second opposed surface,
the second light source being inclined to a second straight line perpendicular to the fourth side surface.
2. The illumination device of claim 1, further comprising:
a second layer located on the third side surface side in the first direction and including a second prism provided on the second opposed surface.
3. An illumination device comprising:
a first light guide having a first side surface, a second side surface located on a side opposite to the first side surface in a first direction, a first main surface, and a first opposed surface located on a side opposite to the first main surface in a second direction intersecting the first direction; and
a first light source opposed to the first side surface to emit first P-polarized light to the first side surface,
the first side surface being inclined to the first main surface and the first opposed surface,
the first light source being inclined to a first straight line perpendicular to the first side surface,
at least a portion of the first light source being located away from the first main surface in the second direction, and
the first light source being inclined to the first main surface with respect to the first straight line, in the second direction.
4. The illumination device of claim 3, wherein
the first P-polarized light is made incident on the first side surface from the first main surface side at a Brewster's angle with respect to the first straight line, in the second direction.
5. The illumination device of claim 1, wherein
the first P-polarized light is made incident on the first side surface from the first main surface side at 56° with respect to the first straight line, in the second direction.
6. The illumination device of claim 5, wherein
the first side surface is inclined to the first main surface at 82.9° and inclined to the first opposed surface at 97.1°.
7. An illumination device comprising:
a first light guide having a first side surface, a second side surface located on a side opposite to the first side surface in a first direction, a first main surface, and a first opposed surface located on a side opposite to the first main surface in a second direction intersecting the first direction; and a first light source opposed to the first side surface to emit first P-polarized light to the first side surface, the first side surface being inclined to the first main surface and the first opposed surface, the first light source being inclined to a first straight line perpendicular to the first side surface, the first light source being arranged between heights of the first main surface and the first opposed surface, in the second direction.

8. A display device comprising:

the illumination device of claim 3; and a display panel displaying an image, the display panel being opposed to the first main surface.

9. The illumination device of claim 7, wherein the first light source is inclined to the first main surface side with respect to the first straight line, in the second direction.

10. The illumination device of claim 9, wherein the first P-polarized light is made incident on the first side surface from the first main surface side at a Brewster's angle with respect to the first straight line, in the second direction.

11. The illumination device of claim 9, wherein the first P-polarized light is made incident on the first side surface from the first main surface side at 56° with respect to the first straight line, in the second direction.

12. The illumination device of claim 11, wherein the first side surface is inclined to the first main surface at 29.9° and inclined to the first opposed surface at 150.1°.

13. An illumination device comprising:

a first light guide having a first side surface, a second side surface located on a side opposite to the first side surface in a first direction, a first main surface, a first opposed surface located on a side opposite to the first main surface in a second direction intersecting the first direction;

a first light source opposed to the first side surface to emit first P-polarized light to the first side surface; and a first layer located on the second side surface side in the first direction and including a first prism provided on the first opposed surface, the first side surface being inclined to the first main surface and the first opposed surface, the first light source being inclined to a first straight line perpendicular to the first side surface.

* * * * *